(12) United States Patent
Eguchi et al.

(10) Patent No.: US 11,985,281 B2
(45) Date of Patent: May 14, 2024

(54) READING APPARATUS, METHOD OF CONTROLLING READING APPARATUS, AND IMAGE READING SYSTEM FOR SUGGESTING SUITABLE READING SETUP OR USE PATH

(71) Applicant: SEIKO EPSON CORPORATION, Tokyo (JP)

(72) Inventors: Haruya Eguchi, Kitakyushu (JP); Nobu Tagawa, Fukutsu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/169,562

(22) Filed: Feb. 15, 2023

(65) Prior Publication Data
US 2023/0269337 A1    Aug. 24, 2023

(30) Foreign Application Priority Data
Feb. 18, 2022  (JP) .................................. 2022-023841

(51) Int. Cl.
*H04N 1/00*          (2006.01)
(52) U.S. Cl.
CPC ....... *H04N 1/00612* (2013.01); *H04N 1/0057* (2013.01); *H04N 1/00806* (2013.01)
(58) Field of Classification Search
USPC ....................................................... 358/498
See application file for complete search history.

(56) References Cited

U.S. PATENT DOCUMENTS

| 2021/0127021 A1* | 4/2021 | Ishihara ............. H04N 1/00811 |
| 2021/0281689 A1* | 9/2021 | Taniyama .......... H04N 1/00708 |
| 2023/0283727 A1* | 9/2023 | Kimura .................. G03G 15/00 |
| | | 358/1.14 |

FOREIGN PATENT DOCUMENTS

JP          2001-088981 A      4/2001

\* cited by examiner

*Primary Examiner* — Jacky X Zheng
(74) *Attorney, Agent, or Firm* — WORKMAN NYDEGGER

(57) ABSTRACT

A reading apparatus includes a reading unit that reads a document, a transport path, an output path for outputting the document read by the reading unit, a display unit that displays a setup screen, and a control unit configured to control the reading unit and the display unit. The output path includes a first output path and a second output path that separately lead to different document output destinations, and the output path is formed such that a use path used to output the document is changed between the first output path and the second output path. The control unit is configured to obtain path information indicating the use path and a reading setup. The control unit is configured to, based on the reading setup and the path information, cause the display unit to display a suggestion indication suggesting changing the reading setup or suggesting changing the use path.

9 Claims, 17 Drawing Sheets

FIG. 6

| Settings | Path information |
|---|---|
| Lamination setting — ON | Use path — First output path |
| Size setting — Card or booklet | Use path — First output path |
| Format setting — Single-page PDF | Use path — Second output path |
| Reading setting — Both sides | Use path — Second output path |
| Flip setting — Flip vertically | Use path — Second output path |
| Edge erase setting — OFF | Use path — Second output path |
| Blank page deletion setting — ON | Use path — Second output path |

FIG. 11

| Settings | Use path | |
|---|---|---|
| | First output path | Second output path |
| Size setting | Auto detection | Card |
| Lamination setting | OFF | ON |
| Format setting | Single-page PDF or single-page TIFF | Multi-page PDF or multi-page TIFF |
| Reading setting | Both sides | One side |
| Flip setting | Flip vertically | Flip horizontally |
| Edge erase setting | OFF | ON |
| Blank page deletion setting | ON | OFF |

READING APPARATUS, METHOD OF CONTROLLING READING APPARATUS, AND IMAGE READING SYSTEM FOR SUGGESTING SUITABLE READING SETUP OR USE PATH

The present application is based on, and claims priority from JP Application Serial Number 2022-023841, filed Feb. 18, 2022, the disclosure of which is hereby incorporated by reference herein in its entirety.

BACKGROUND

1. Technical Field

The present disclosure relates to, for example, a reading apparatus, a method of controlling a reading apparatus, and an image reading system.

2. Related Art

JP-A-2001-88981 describes a reading apparatus having a first output path and a second output path; when a document is read, the document is outputted along the first output path or the second output path. This reading apparatus is configured to switch the path for transporting a document between the first output path and the second output path depending on the stiffness of the document.

On the reading apparatus of this type, before reading a document, a reading setup about reading of the document is configured. Depending on the reading setup, a particular output path may be suitable to output the document.

SUMMARY

A reading apparatus includes a reading unit configured to read a document, a transport path for transporting the document to the reading unit, an output path for outputting the document read by the reading unit, a display unit configured to display a setup screen, and a control unit configured to control the reading unit and the display unit. The output path includes a first output path and a second output path that separately lead to different document output destinations, and the output path is formed such that a use path used to output the document is changed between the first output path and the second output path. The control unit is configured to obtain path information indicating the use path and obtain a reading setup about document reading, and based on the reading setup and the path information, cause the display unit to display a suggestion indication suggesting changing the reading setup or suggesting changing the use path.

A method of controlling a reading apparatus configured such that a use path used to output a document read by a reading unit is changed between a first output path and a second output path, includes obtaining path information indicating the use path, obtaining a reading setup about document reading, and based on the reading setup and the path information, displaying a suggestion indication suggesting changing the reading setup or suggesting changing the use path.

An image reading system includes a reading apparatus configured such that a use path used to output a document read by a reading unit is changed between a first output path and a second output path and an external control unit included in an external device connected to the reading apparatus. The external control unit is configured to obtain path information indicating the use path and obtain a reading setup about document reading, and based on the reading setup and the path information, display a suggestion indication suggesting changing the reading setup or suggesting changing the use path.

BRIEF DESCRIPTION OF THE DRAWINGS

FIG. 6 is a table indicating an example of unsuitable combinations of a reading setup and a use path.

FIG. 11 is a table indicating an example of initial values of settings.

DESCRIPTION OF EXEMPLARY EMBODIMENTS

Hereinafter, an embodiment of a reading apparatus will be described with reference to the drawings. The reading apparatus is a sheet feed scanner in which while a document such as a sheet or film is transported, a fixed reading unit reads the document.

Structure of Reading Apparatus

Figure 1:
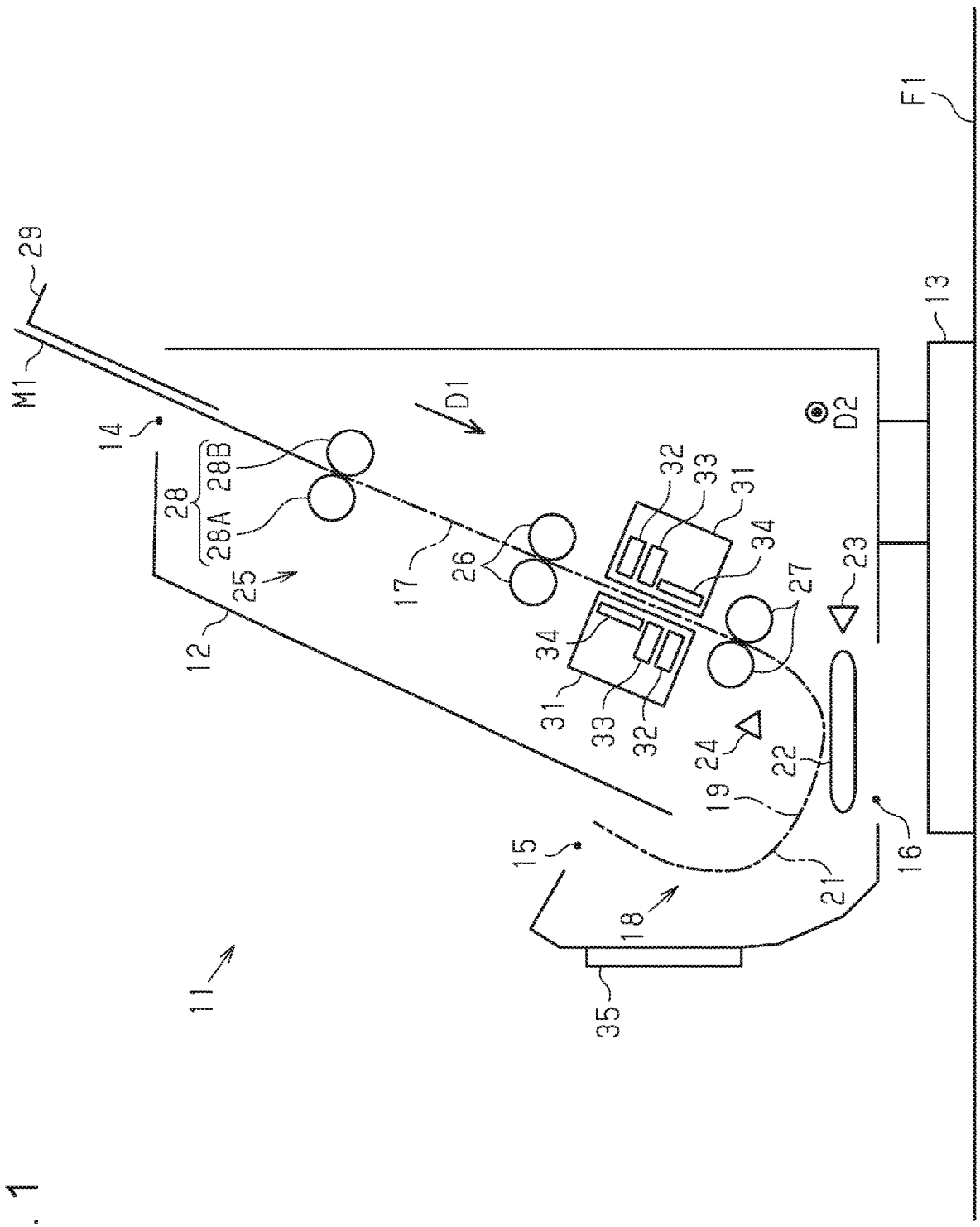
FIG. 1 is a side view of a reading apparatus in a first position.
Figure 2:
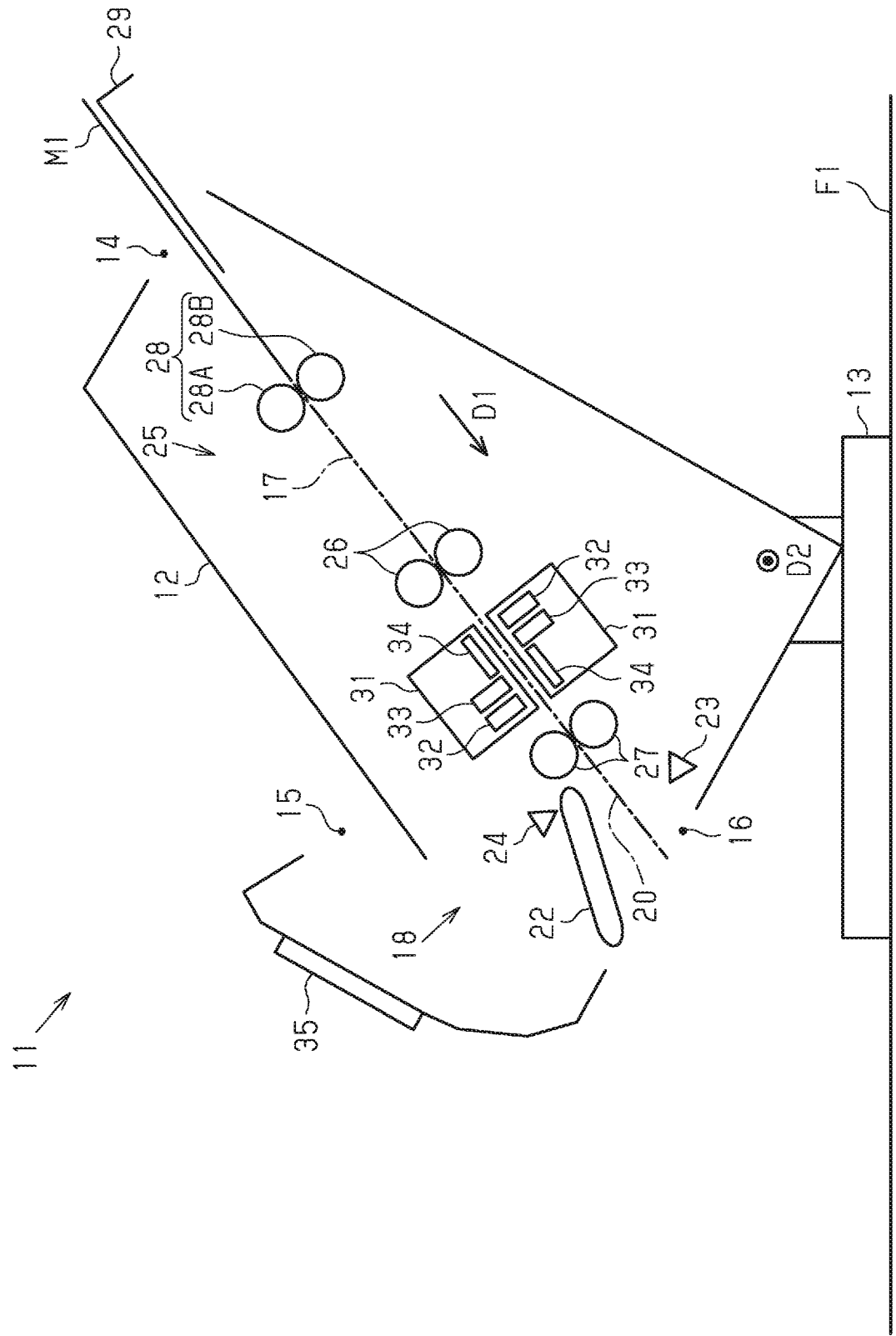
FIG. 2 is a side view of the reading apparatus in a second position.

As illustrated in FIGS. 1 and 2, a reading apparatus 11 includes a casing 12 and a supporting member 13. The supporting member 13 supports the casing 12. The supporting member 13 is mounted on a mounting surface F1. The mounting surface F1 may be, for example, a horizontal surface. The casing 12 is rotatable on the supporting member 13.

The position of the casing 12 is changeable. The casing 12 can be set in multiple kinds of positions among which the tilt angle relative to the mounting surface F1 differs. The position of the casing 12 is changed by, for example, rotating the casing 12 on the supporting member 13.

The position of the casing 12 is changeable between a first position and a second position. The tilt angle of the casing 12 relative to the mounting surface F1 differs between the first position and the second position. In FIG. 1, the casing 12 is in the first position. In FIG. 2, the casing 12 is in the second position. The position of the casing 12 is changed from the first position to the second position by rotating the casing 12 in FIG. 1 in the clockwise direction. The inclination of the casing 12 relative to the supporting member 13 is changed between when the casing 12 is in the first position and when the casing 12 is in the second position. When the casing 12 is in the first position, the footprint of the reading apparatus 11 is smaller than when the casing 12 is in the second position. In addition to the first position and the second position, the casing 12 may be set in a third position.

An input slot 14 and one or more output slots are formed in the casing 12. The input slot 14 is an opening for inputting a document M1. The document M1 is inputted into the casing 12 through the input slot 14. The output slots are openings for outputting the document M1. The document M1 is outputted from the casing 12 through the output slot. In this example, a first output slot 15 and a second output slot 16 are formed in the casing 12.

The reading apparatus 11 has a transport path 17. Along the transport path 17, the document M1 is transported toward reading units 31 described later. The transport path 17 leads from the input slot 14 to the reading units 31. As a result, the document M1 is transported along the transport path 17, so that the document M1 is fed to the reading units 31. The transport path 17 is extended in, for example, a straight line or substantially straight line. The transport path 17 leads in a transport direction D1.

By changing the position of the casing 12, the tilt angle of the transport path 17 is changed. In this example, when the casing 12 is in the second position, the tilt angle of the transport path 17 relative to the mounting surface F1 is shallower than when the casing 12 is in the first position.

The reading apparatus 11 has an output path 18. Along the output path 18, the document M1 read by the reading units 31 is outputted. The output path 18 includes a first output path 19 and a second output path 20. The first output path 19 and the second output path 20 output the document M1 to different output destinations. The output path 18 may include three or more paths for outputting the document M1 to different destinations.

The first output path 19 leads from the reading units 31 to the first output slot 15. The second output path 20 leads from the reading units 31 to the second output slot 16. For example, the first output path 19 and the second output path 20 are separated at some midpoint.

The output path 18 is formed such that the path to be used to output the document M1, that is, a use path is changeable between the first output path 19 and the second output path 20. When the use path is the first output path 19, the document M1 read by the reading units 31 is outputted along the first output path 19. When the use path is the second output path 20, the document M1 read by the reading units 31 is outputted along the second output path 20.

The first output path 19 has a curved portion 21. The curved portion 21 is a portion curved in the first output path 19. In the first output path 19, the curved portion 21 starts from, for example, a branch point at which the first output path 19 is separated from the second output path 20. The curved portion 21 is curved in, for example, a U-shape. As a result, the document M1 transported along the first output path 19 is curved and outputted. The first output path 19 is used when, for example, the casing 12 is in the first position.

In other words, when the casing 12 is in the first position, the document M1 is transported along the first output path 19.

The second output path 20 is extended in, for example, a straight line or substantially straight line. The second output path 20 leads in, for example, the transport direction D1. Unlike the first output path 19, the second output path 20 does not include any curved portion. As a result, the document M1 transported along the second output path 20 is outputted without being curved. The second output path 20 is used when, for example, the casing 12 is in the second position. In other words, when the casing 12 is in the second position, the document M1 is transported along the second output path 20. In this example, the use path is changed in the reading apparatus 11 depending on the position of the casing 12.

In the reading apparatus 11, the path suitable to output the document M1 changes depending on the type of the document M1. In other words, depending on the type of the document M1, the path suitable as the use path changes. For example, when the document M1 to be read is of high stiffness, the use path is preferably the second output path 20. This is because in the case in which the stiffness of the document M1 is relatively high, the document M1 can become damaged when the document M1 passes along the curved portion 21. Examples of the document M1 of high stiffness include a card and a document M1 subjected to lamination.

To handle booklets such as passports and pamphlets, the use path is preferably the second output path 20. This is because when a booklet is transported along the first output path 19, the booklet can cause a jam in the curved portion 21.

In this example, the first output path 19 is usable, for example, when the document M1 to be read is of low stiffness. Examples of the document M1 of low stiffness include a sheet. To read the document M1 of low stiffness, the use path may also be the second output path 20 as well as the first output path 19. Overall, for use of the first output path 19, the type of the document M1 is limited; by contrast, for use of the second output path 20, the type of the document M1 is not limited.

In this example, the second output path 20 is used to read, for example, a card, laminated document M1, or booklet. When a user uses the reading apparatus 11 to read, for example, a card, laminated document M1, or booklet, the user usually causes the reading apparatus 11 to read a single document M1 in many cases. In other words, the user is less likely to cause the reading apparatus 11 to successively read a plurality of cards or booklets. As a result, in this example, when the position of the casing 12 is the second position, that is, when the use path is the second output path 20, the reading apparatus 11 reads a single document M1. In this example, when the use path is the second output path 20, the reading apparatus 11 does not read a plurality of documents M1 successively.

The reading apparatus 11 includes a switching member 22. The switching member 22 may be, for example, a flap. The switching member 22 changes the use path between the first output path 19 and the second output path 20. The switching member 22 changes the use path by blocking the first output path 19 or the second output path 20. When the switching member 22 blocks the first output path 19, the use path is the second output path 20. When the switching member 22 blocks the second output path 20, the use path is the first output path 19.

The switching member 22 moves, for example, in accordance with the position of the casing 12. When the casing 12 is in the first position, the switching member 22 blocks the second output path 20. When the casing 12 is in the second position, the switching member 22 blocks the first output path 19. The user changes the use path by, for example, manually changing the position of the casing 12. The switching member 22 may move irrespective of the position of the casing 12. This means that, irrespective of the position of the casing 12, the switching member 22 may be moved by an actuator to change the path.

The reading apparatus 11 may include, for example, one or more path sensors for detecting the use path. The path sensor detects the use path by, for example, detecting the switching member 22. The path sensor may detect the use path by detecting the position of the casing 12. For example, the reading apparatus 11 includes a first path sensor 23 and a second path sensor 24.

The first path sensor 23 is configured to detect, for example, the switching member 22 blocking the second output path 20. When the first path sensor 23 detects the switching member 22, the first output path 19 is recognized as the use path.

The second path sensor 24 is configured to detect, for example, the switching member 22 blocking the first output path 19. When the second path sensor 24 detects the switching member 22, the second output path 20 is recognized as the use path.

The reading apparatus 11 may determine that the use path is the first output path 19 when the first path sensor 23 detects the switching member 22; and the reading apparatus 11 may determine that the use path is the second output path 20 when the first path sensor 23 dose not detect the switching member 22. The reading apparatus 11 may determine that the use path is the second output path 20 when the second path sensor 24 detects the switching member 22; and the reading apparatus 11 may determine that the use path is the first output path 19 when the second path sensor 24 does not detect the switching member 22. In these cases, only one path sensor is necessary. The path sensor is not limited to a sensor for detecting the switching member 22. The path sensor may be, for example, a gyro sensor for detecting the position of the casing 12. This means that the reading apparatus 11 may identify the use path based on the position of the casing 12. The reading apparatus 11 may include a sensor for detecting the position of the casing 12 and a sensor for locating the switching member 22 in a discrete manner.

The reading apparatus 11 includes a transport unit 25. The transport unit 25 is configured to transport the document M1. The transport unit 25 transports the document M1 along the transport path 17. The transport unit 25 transports the document M1 along the output path 18. The transport unit 25 includes, for example, one or more rollers. The transport unit 25 includes, for example, a first roller pair 26 and a second roller pair 27. The transport unit 25 may include, for example, a feed roller pair 28.

The first roller pair 26 is arranged in the transport path 17. The second roller pair 27 is arranged in the output path 18. The feed roller pair 28 is arranged in the transport path 17. The feed roller pair 28 is arranged upstream in the transport path 17 with respect to the first roller pair 26. In the transport direction D1, the feed roller pair 28, the first roller pair 26, and the second roller pair 27 are arranged in the order presented. The feed roller pair 28, the first roller pair 26, and the second roller pair 27 transport the document M1 by rotating while the document M1 is between rollers.

In the output path 18, the second roller pair 27 is arranged at the branch point at which the first output path 19 and the second output path 20 are separated. Thus, the first output path 19 and the second output path 20 are separated at the point at which the second roller pair 27 is disposed. The reading units 31 are between the first roller pair 26 and the second roller pair 27 in the transport direction D1.

The feed roller pair 28 is a roller pair for separating documents M1 one by one. The feed roller pair 28 include, for example, a roller having a coefficient of friction against the document M1 higher than the coefficient of friction between documents M1. For example, the feed roller pair 28 includes a feed roller 28A and a separation roller 28B. The feed roller 28A provides drive rotation. The separation roller 28B has a coefficient of friction against the document M1 higher than the coefficient of friction between documents M1. Usually, a rotational load is applied to the separation roller 28B by, for example, a torque limiter. As a result, when a plurality of documents M1 are inserted between the feed roller 28A and the separation roller 28B, while the feed roller 28A provides drive rotation, following rotation of the separation roller 28B is hindered. Consequently, the documents M1 are separated one by one by the feed roller 28A and the separation roller 28B. This reduces the possibility that a plurality of documents M1 are transported together as a stack.

In this example, when the use path is the second output path 20, that is, when the position of the casing 12 is in the second position, the function of separating documents M1 with the feed roller pair 28 is stopped. For example, the rotational load applied to the separation roller 28B by a torque limiter is cut off, and as a result, the function of separating documents M1 with the feed roller pair 28 is stopped. In this case, the separation roller 28B easily rotates following the rotation of the feed roller 28A. Stopping the function of separating documents M1 with the feed roller pair 28 is desirable, for example, when a booklet is read. When a booklet is read, if the function of separating documents M1 with the feed roller pair 28 is active, the booklet can be transported in an inappropriate manner. Further, in this example, when the use path is the second output path 20, a plurality of documents M1 are not successively read. Thus, stopping the function of separating documents M1 with the feed roller pair 28 does not cause any problem.

The reading apparatus 11 includes a tray 29. The tray 29 is fixed to the casing 12. The tray 29 is extended from the inside of the casing 12 through the input slot 14 to the outside of the casing 12. On the tray 29, the document M1 to be read can be disposed. On the tray 29, one or more documents M1 can be stacked. The document M1 is disposed on the tray 29 in the state in which the leading edge of the document M1 is in the input slot 14. The leading edge of the document M1 disposed on the tray 29 is in contact with the feed roller pair 28. More specifically, the leading edge of the document M1 disposed on the tray 29 is in contact with the feed roller 28A.

The reading apparatus 11 includes one or more reading units 31. The reading units 31 are contained in the casing 12. The reading units 31 are configured to read the document M1. The reading units 31 read the document M1 being transported along the transport path 17.

The reading apparatus 11 includes, for example, two reading units 31. The two reading units 31 are arranged at the point at which the transport path 17 is connected to the output path 18. The two reading units 31 face each other. The reading units 31 are elongated in a scan direction D2. The scan direction D2 crosses the transport direction D1. When the scan direction D2 is referred to as a main scanning direction, the transport direction D1 is also referred to as a sub scanning direction.

The two reading units 31 respectively read different sides of the document M1. Of the two reading units 31, one reading unit 31 reads a front side of the document M1, and the other reading unit 31 reads a back side of the document M1. With this configuration, the reading apparatus 11 reads one side or both sides of the document M1.

The reading unit 31 includes, for example, a light source 32, a plurality of image sensors 33, and a background plate 34. The light source 32 may be, for example, a light-emitting diode (LED) or fluorescent lamp. The light source 32 illuminates the facing reading unit 31.

The image sensors 33 are aligned in the scan direction D2. The image sensors 33 are modularized. The image sensor 33 may be, for example, a contact image sensor. Specifically, the image sensor 33 is a complementary metal-oxide semiconductor (CMOS) image sensor. The image sensor 33 photoelectrically converts received light. The image sensor 33 outputs an output signal of a value corresponding to the amount of received light.

The image sensor 33 may be a monochrome sensor or color sensor. The reading unit 31 may be configured to read the document M1 in full color. For example, the reading unit 31 may be configured to read the document M1 in three RGB colors. The reading unit 31 may be configured to read the document M1 in grayscale.

The background plate 34 faces, for example, the image sensors 33 and the light source 32 of the other reading unit 31. The light source 32 of the facing reading unit 31 illuminates the background plate 34. The background plate 34 reflects the emitted light. The light reflected by the background plate 34 strikes the image sensors 33 of the reading unit 31 facing the background plate 34. The image sensors 33 read the background plate 34 as a background together with the document M1.

The reading apparatus 11 includes a display unit 35. The display unit 35 is fixed to the casing 12. The display unit 35 provides information for the user by, for example, displaying information. The display unit 35 is, for example, a touch panel. The display unit 35 also serves as a receive unit for receiving, for example, operations by the user. The display unit 35 is not limited to a touch panel and may be a display. In this case, the reading apparatus 11 may also include buttons, switches, or other interfaces as a receive unit. The information displayed by the display unit 35 will be described later.

Figure 3:
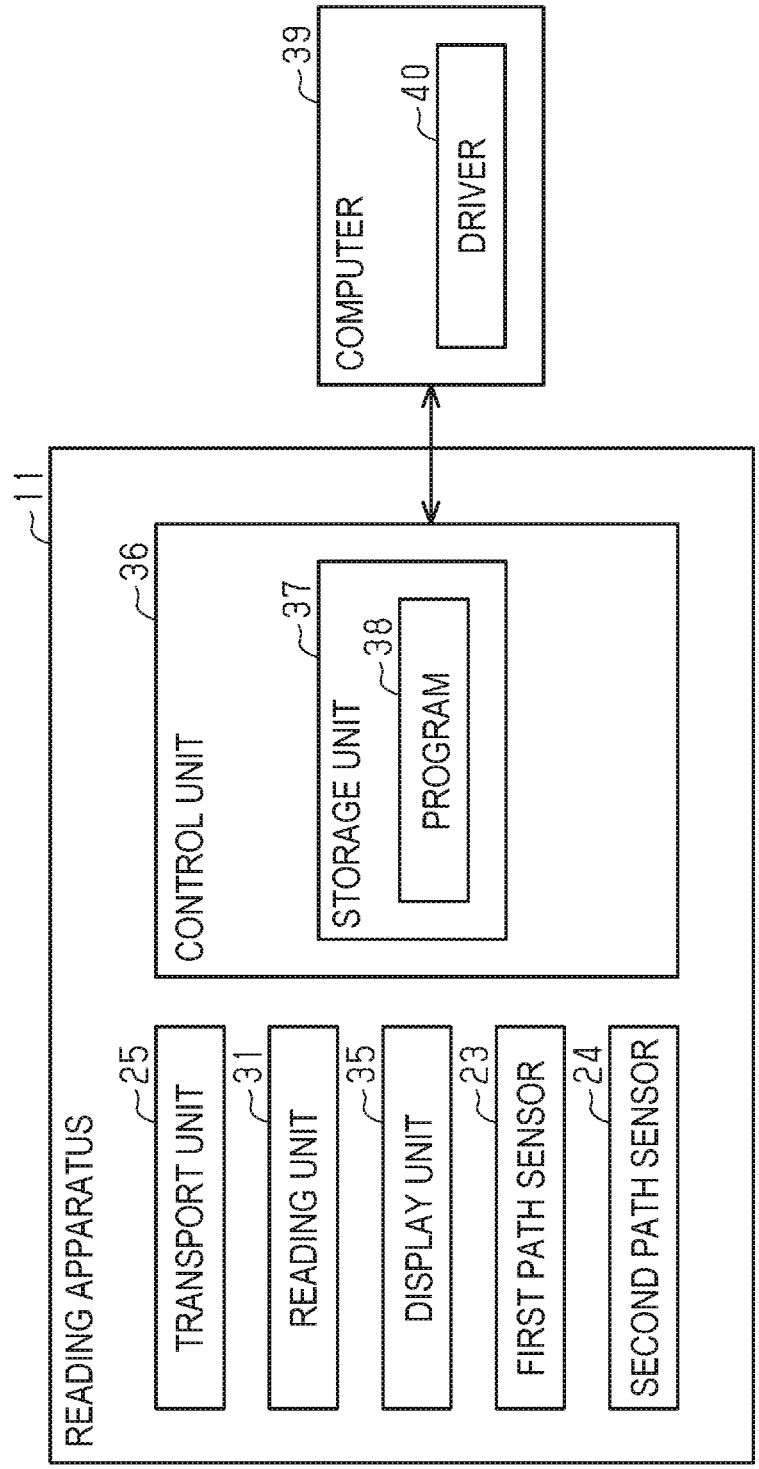
FIG. 3 is a block diagram illustrating an electrical configuration of the reading apparatus.

As illustrated in FIG. 3, the reading apparatus 11 includes a control unit 36. The control unit 36 controls the reading apparatus 11. The control unit 36 controls, for example, the transport unit 25, the reading units 31, and the display unit 35.

The control unit 36 may be a circuit including one or more processors configured to perform various operations in accordance with a computer program. The control unit 36 may be a circuit including one or more dedicated hardware circuits such as application-specific integrated circuits each configured to perform at least a portion of the various operations. The control unit 36 may be a circuit including a processor and a set of hardware circuits. The processor includes a central processing unit (CPU) and a memory such as a random-access memory (RAM) and a read-only memory (ROM). The memory stores program codes or commands created to cause the CPU to perform operations. The memory, which is a computer-readable medium, may be any readable medium accessible by a general-purpose or dedicated computer.

The control unit 36 is configured to obtain path information, which is information indicating the use path. The control unit 36 obtains path information from, for example, the first path sensor 23 and the second path sensor 24. For example, from the first path sensor 23, the control unit 36 obtains path information indicating that the use path is the first output path 19. For example, from the second path sensor 24, the control unit 36 obtains path information indicating that the use path is the second output path 20. In this manner, the control unit 36 recognizes the use path.

The control unit 36 includes a storage unit 37. The storage unit 37 is, for example, the memory described above. The storage unit 37 stores a program 38. By running the program 38, the control unit 36 causes the display unit 35 to display information.

The control unit 36 obtains image data from the reading units 31. Specifically, the control unit 36 receives an output signal from the reading unit 31. The control unit 36 performs A/D conversion on the output signal to obtain image data. When the control unit 36 obtains image data, the control unit 36 may subject the output signal to, for example, shading compensation and gamma correction.

The control unit 36 is configured to communicate with a computer 39 operated by the user. A driver 40 for communicating with the reading apparatus 11 is installed in the computer 39. The computer 39 is, for example, a personal computer or smartphone.

Display by Display Unit

The following describes information displayed by the display unit 35. The control unit 36 controls the information displayed by the display unit 35.

Figure 4:
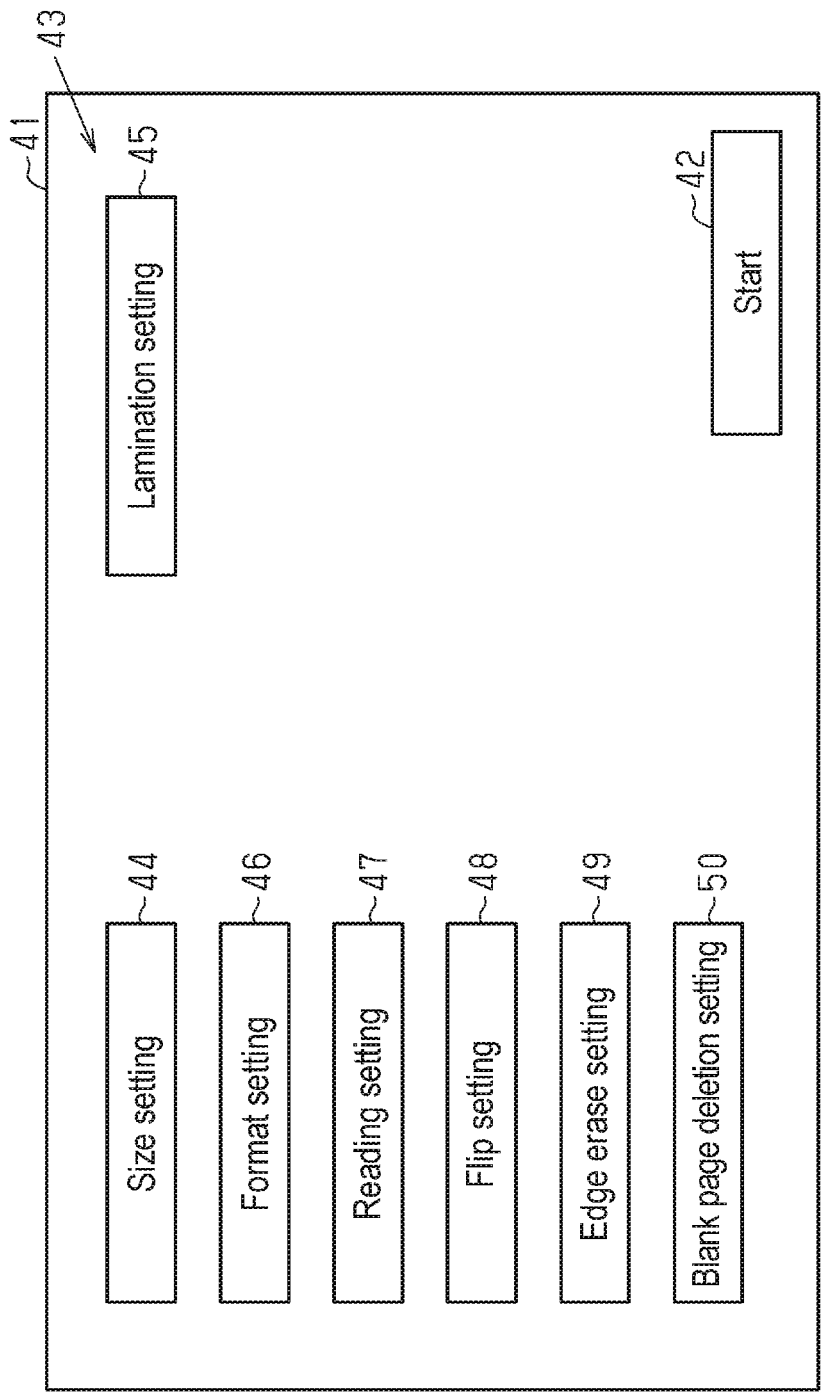
FIG. 4 schematically illustrates a setup screen.

As illustrated in FIG. 4, the display unit 35 displays a setup screen 41. The setup screen 41 is a screen for configuring a reading setup about reading of the document M1. The setup screen 41 is displayed, for example, when a home screen of the display unit 35 is operated. The setup screen 41 may be displayed on the display unit 35 when the document M1 is set on the tray 29. A reading setup is configured on the setup screen 41 by user's operations.

A start button 42 is displayed on the setup screen 41. When the start button 42 is operated, the control unit 36 receives an instruction to start reading the document M1. Specifically, when the start button 42 is operated after a reading setup is configured, the operation of reading the document M1 is performed in accordance with the reading setup.

A plurality of settings 43 are displayed on the setup screen 41. The settings 43 specify details of reading setup. The settings 43 indicate settings selectable by the user. The user configures the settings 43 by, for example, operating the setup screen 41. Of the plurality of settings 43, one setting 43 may be referred to as a first setting, and another setting 43 different from the first setting may be referred to as a second setting.

The reading setup includes, for example, a size setting 44, which is the setting 43 about the document size. As the size setting 44, for example, A4 sheet, B5 sheet, auto detection, card, or booklet can be selected. As such, the size setting 44 indicates whether the document M1 is a card or booklet. Auto detection is a setting for automatically detecting the document size. When auto detection is set, the control unit 36 automatically detects the document size based on image data. Auto detection is usually used to read a sheet.

The reading setup includes, for example, a lamination setting 45, which is the setting 43 about lamination. The lamination setting 45 indicates whether the document M1 is laminated. As the lamination setting 45, for example, ON or OFF can be selected. When the lamination setting 45 is ON, this means that the laminated document M1 is to be read. When the lamination setting 45 is OFF, this means that the document M1 without lamination is to be read. When the lamination setting 45 is ON, reading is performed on an area larger than the size of the document M1 set as the size setting 44. This is because when the document M1 is laminated with a laminate material, it is necessary to read the area including the laminate material.

The reading setup includes, for example, a format setting 46, which is the setting 43 about the format for outputting image data. As the format setting 46, for example, single-page PDF, multi-page PDF, single-page TIFF, multi-page TIFF, single-page PDF/A, or multi-page PDF/A can be selected. Single-page means that when a plurality of documents M1 are successively read, a single file is outputted for each read side of each document M1. Multi-page means that when a plurality of documents M1 are successively read, a single file is outputted for the documents M1. For example, when the format setting 46 indicates single-page PDF, the control unit 36 outputs PDF files of individual pages of image data. For example, when the format setting 46 indicates multi-page PDF, the control unit 36 outputs one PDF file of the collection of pages of image data.

The reading setup includes, for example, a reading setting 47, which is the setting 43 about both-side reading. The reading setting 47 indicates whether both sides of the document M1 are to be read. As the reading setting 47, for example, both sides or one side can be selected. When the reading setting 47 indicates both sides, this means that both sides of the document M1 are to be read. When the reading setting 47 indicates one side, this means that one side of the document M1 is to be read.

The reading setup includes, for example, a flip setting 48, which is the setting 43 about the flip direction of the document M1. When both sides of the document M1 are read, the flip direction determines the orientation of the back side relative to the front side. Hence, the flip setting 48 is selectable, for example, when both sides is selected as the reading setting 47. As the flip setting 48, flip vertically or flip horizontally can be selected. The flip direction changes the position at which image data of the front side and image data of the back side are bound. In other words, the flip direction determines the binding position of image data. When the flip direction indicates flip vertically, this means that the document M1 is to be read such that the front and back sides are bound at top and bottom edges. When the flip direction indicates flip horizontally, this means that the document M1 is to be read such that the front and back sides are bound at right and left edges.

The reading setup includes, for example, a processing setting that is the setting 43 about an image processing operation to be performed on image data. The processing setting indicates whether a particular image processing operation is to be performed on image data. The processing setting includes, for example, an edge erase setting 49 and a blank page deletion setting 50. As the edge erase setting 49 and the blank page deletion setting 50, ON or OFF can be selected.

Edge erase is a processing operation of removing shadows of the document M1 appearing at edges of image data. When the edge erase setting 49 is ON, this means that shadows of the document M1 appearing at edges of image data are to be removed. Blank page deletion is a processing operation of deleting data of a blank page included in image data. When the blank page deletion setting 50 is ON, this means that data of a blank page in image data is to be deleted.

The control unit 36 obtains the reading setup and the path information, for example, when the start button 42 is operated. The control unit 36 checks the correspondence between the reading setup and the path information. Specifically, the control unit 36 checks the correspondence between the settings 43 and the path information. When the control unit 36 determines that the use path indicated by the path information is suitable for the reading setup, the control unit 36 starts the operation of reading the document M1. Specifically, the control unit 36 causes the transport unit 25 to transport the document M1 disposed on the tray 29. When the control unit 36 determines that the use path is not suitable for the reading setup, the control unit 36 causes the display unit 35 to display an indication suggesting changing the reading setup, an indication suggesting changing the use path, or both.

The timing when the control unit 36 checks the correspondence between the reading setup and the path information is not necessarily when the start button 42 is operated. The control unit 36 may check the correspondence between the reading setup and the path information while a reading setup is being set on the setup screen 41. For example, when the reading setup is changed on the setup screen 41, the control unit 36 may obtain path information. The control unit 36 may check the correspondence between the reading setup after change and the obtained path information. When the control unit 36 determines that the use path is not suitable for the reading setup, the control unit 36 causes the display unit 35 to display an indication suggesting changing the reading setup, an indication suggesting changing the use path, or both. The period while a reading setup is being set on the setup screen 41 may be the period since the setup screen 41 is displayed on the display unit 35 until the user finishes setting a reading setup. For example, the period while a reading setup is being configured on the setup screen 41 includes the period since the display unit 35 changes from the home screen to the setup screen 41 until the start button 42 is operated. For example, the period while a reading setup is being configured on the setup screen 41 includes the timing of performing operations with the settings 43 on the setup screen 41.

Figure 5:
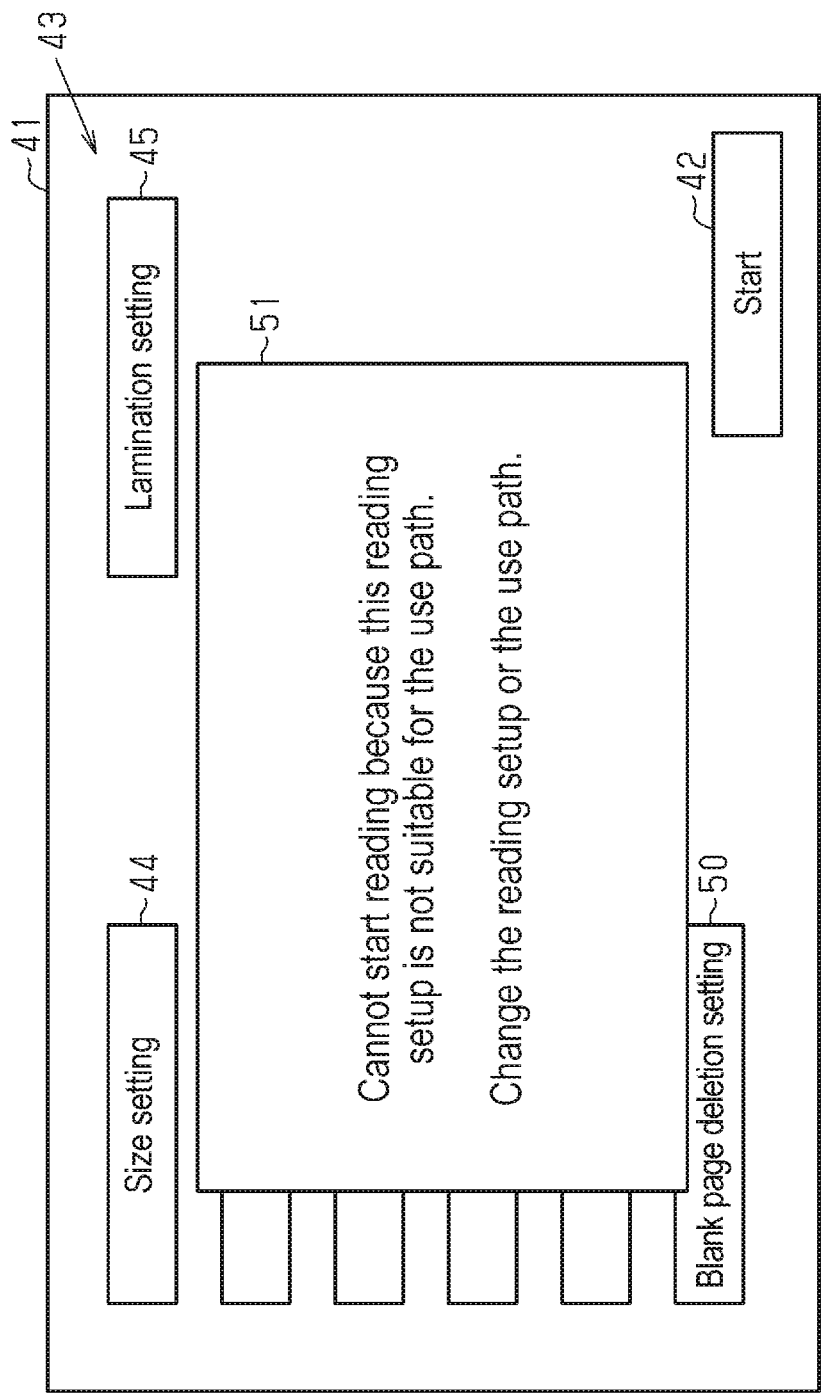
FIG. 5 schematically illustrates the setup screen with a suggestion indication when a document can become damaged.

As illustrated in FIG. 5, the control unit 36 causes the display unit 35 to display a suggestion indication 51 in accordance with the reading setup and the path information. The suggestion indication 51 is an indication suggesting changing the reading setup or suggesting changing the use path. Thus, the suggestion indication 51 is an indication suggesting changing the reading setup, an indication suggesting changing the use path, or an indication suggesting both. The suggestion indication 51 includes, for example, an indication of a reading setup suitable for the use path or an indication of a use path suitable for the reading setup.

The suggestion indication 51 is, for example, a message. For example, the suggestion indication 51 is superimposed on the setup screen 41. For example, the suggestion indication 51 is displayed as a pop-up. With the suggestion indication 51, the control unit 36 suggests changing the reading setup or changing the use path. The user views the suggestion indication 51 and understands that the reading setup or the use path needs to be changed to properly read the document M1. The user changes the reading setup or the use path, and as a result, the document M1 is outputted by using the use path suitable for the reading setup. In other words, the document M1 is read with the reading setup suitable for the use path.

In the reading apparatus 11, the path suitable to output the document M1 changes depending on the reading setup. For example, as described above, the path suitable to output the document M1 changes depending on the type of the document M1. The type of the document M1 is set as the size setting 44. Particular combinations of the size setting 44 and the use path are suitable to read the document M1. Also regarding other settings 43 such as the format setting 46 and the reading setting 47, particular combinations are suitable for individual use paths. FIG. 6 presents an example of combinations of a reading setup and a use path, about which the suggestion indication 51 is to be displayed.

As illustrated in FIG. 6, when the lamination setting 45 is ON, and the use path is the first output path 19, the control unit 36 determines that the use path is not suitable for the reading setup. As a result, when the reading setup indicates that the document M1 is laminated, and the use path is the first output path 19, the control unit 36 causes the display unit 35 to display the suggestion indication 51.

When the lamination setting 45 is ON, the document M1 to be inputted to the reading apparatus 11 is highly likely to be a laminated document. When the use path is the first output path 19, the document M1 can become damaged. In this case, the reading setup is to be changed; otherwise, until the use path is changed, reading of the document M1 is prohibited. In other words, when the lamination setting 45 is ON, and the use path is the first output path 19, the control unit 36 does not start the operation of reading the document M1. When the lamination setting 45 is ON, and the use path is the first output path 19, the control unit 36 causes the display unit 35 to display the suggestion indication 51 as illustrated in FIG. 5. The user checks the suggestion indication 51 and changes the lamination setting 45 to OFF or changes the use path to the second output path 20.

As illustrated in FIG. 6, when the size setting 44 indicates card, and the use path is the first output path 19, the control unit 36 determines that the use path is not suitable for the reading setup. When the size setting 44 indicates booklet, and the use path is the first output path 19, the control unit 36 also determines that the use path is not suitable for the reading setup. As a result, when the reading setup indicates that the document M1 is a card or booklet, and the use path is the first output path 19, the control unit 36 causes the display unit 35 to display the suggestion indication 51.

When the size setting 44 indicates card, a card is highly likely to be inputted into the reading apparatus 11. When the use path is the first output path 19, the document M1 can become damaged. In this case, the reading setup is to be changed; otherwise, until the use path is changed, reading of the document M1 is prohibited. In other words, when the size setting 44 indicates card, and the use path is the first output path 19, the control unit 36 does not start the operation of reading the document M1. When the size setting 44 indicates card, and the use path is the first output path 19, the control unit 36 causes the display unit 35 to display the suggestion indication 51 as illustrated in FIG. 5. The user checks the suggestion indication 51 and changes the size setting 44 or changes the use path to the second output path 20.

As illustrated in FIG. 6, when the format setting 46 indicates single-page PDF, and the use path is the second output path 20, the control unit 36 determines that the use path is not suitable for the reading setup. As a result, when the reading setup indicates single-page PDF, and the use path is the second output path 20, the control unit 36 causes the display unit 35 to display the suggestion indication 51. As well as single-page PDF, when the reading setup indicates single-page TIFF or single-page PDF/A, and the use path is the second output path 20, the control unit 36 also causes the display unit 35 to display the suggestion indication 51.

When the use path is the second output path 20, the function of separating documents M1 with the feed roller pair 28 is stopped, and only one document M1 is thus read. When only one document M1 is read, it is assumed that the necessity to create separate files of the individual front and back sides of the document M1 is low. When the reading setting 47 indicates one side, the same output is provided for single-page PDF and multi-page PDF. For this reason, in this case, the control unit 36 does not necessarily cause the display unit 35 to display the suggestion indication 51.

When the format setting 46 indicates single-page PDF, and the use path is the second output path 20, there is no possibility that the document M1 can become damaged. For this reason, in this case, the control unit 36 causes the display unit 35 to display the suggestion indication 51 as illustrated in FIG. 7.

Figure 7:
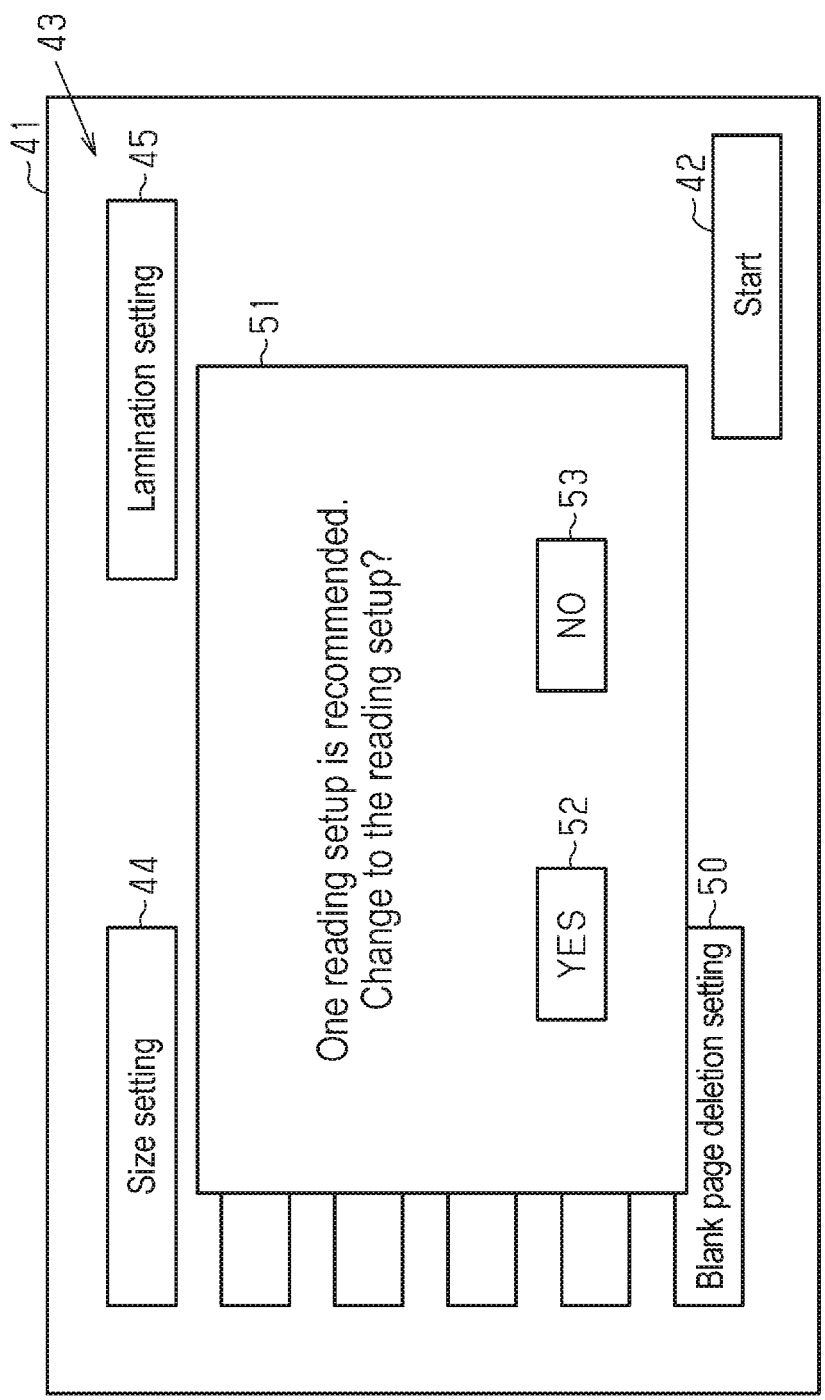
FIG. 7 schematically illustrates the setup screen with a suggestion indication when there is no possibility that a document can become damaged.

As illustrated in FIG. 7, a YES button 52 and a NO button 53 are displayed in the suggestion indication 51. When the YES button 52 is operated, in other words, when permission from the user is obtained, the control unit 36 changes the reading setup to a recommended reading setup. For example, when the format setting 46 indicates single-page PDF, and the use path is the second output path 20, the control unit 36 changes the format setting 46 from single-page PDF to multi-page PDF. When the NO button 53 is operated, in other words, permission from the user is not obtained, the control unit 36 starts the operation of reading the document M1 without changing the format setting 46. This means that the user checks the suggestion indication 51 and selects changing the reading setup or not changing the reading setup.

As illustrated in FIG. 6, when the reading setting 47 indicates both sides, and the use path is the second output path 20, the control unit 36 determines that the use path is not suitable for the reading setup. As a result, when the reading setup indicates that both sides of the document M1 are to be read, and the use path is the second output path 20, the control unit 36 causes the display unit 35 to display the suggestion indication 51.

When the use path is the second output path 20, the function of separating documents M1 with the feed roller pair 28 is stopped, and only one document M1 is thus read. When only one document M1 is read, it is assumed that the necessity to read the front and back sides of the document M1 is low.

When the reading setting 47 indicates both sides, and the use path is the second output path 20, there is no possibility that the document M1 can become damaged. For this reason, in this case, the control unit 36 causes the display unit 35 to display the suggestion indication 51 as illustrated in FIG. 7. When the YES button 52 is operated, the control unit 36 changes the reading setting 47 from both sides to one side. When the NO button 53 is operated, the control unit 36 starts the operation of reading the document M1 without changing the reading setting 47. This means that the user checks the suggestion indication 51 and selects changing the reading setup or not changing the reading setup.

As illustrated in FIG. 6, when the flip setting 48 indicates flip vertically, and the use path is the second output path 20, the control unit 36 determines that the use path is not suitable for the reading setup. As a result, when the flip setting 48 indicates flip vertically, and the use path is the second output path 20, the control unit 36 causes the display unit 35 to display the suggestion indication 51.

When the use path is the second output path 20, the function of separating documents M1 with the feed roller pair 28 is stopped, and only one document M1 is thus read. When only one document M1 is read, it is assumed that binding the front and back sides of the document M1 at top and bottom edges is not convenient for use. When the reading setting 47 indicates one side, because only one side of one document M1 is read, the same output is provided for both flip vertically and flip horizontally. For this reason, in this case, the control unit 36 does not necessarily cause the display unit 35 to display the suggestion indication 51.

When the flip setting 48 indicates flip vertically, and the use path is the second output path 20, there is no possibility that the document M1 can become damaged. For this reason, in this case, the control unit 36 causes the display unit 35 to display the suggestion indication 51 as illustrated in FIG. 7. When the YES button 52 is operated, the control unit 36 changes the flip setting 48 from flip vertically to flip horizontally. When the NO button 53 is operated, the control unit 36 starts the operation of reading the document M1 without changing the flip setting 48. This means that the user checks the suggestion indication 51 and selects changing the reading setup or not changing the reading setup.

As illustrated in FIG. 6, when the edge erase setting 49 indicates OFF, and the use path is the second output path 20, the control unit 36 determines that the use path is not suitable for the reading setup. As a result, when the reading setup indicates that edge erase is to be not performed, and the use path is the second output path 20, the control unit 36 causes the display unit 35 to display the suggestion indication 51.

When the use path is the second output path 20, a relatively thick document M1 can be inputted into the reading apparatus 11. When a relatively thick document M1 is read, shadows of the document M1 can appear at edges of image data.

When the edge erase setting 49 indicates OFF, and the use path is the second output path 20, there is no possibility that the document M1 can become damaged. For this reason, in this case, the control unit 36 causes the display unit 35 to display the suggestion indication 51 as illustrated in FIG. 7. When the YES button 52 is operated, the control unit 36 changes the edge erase setting 49 from OFF to ON. When the NO button 53 is operated, the control unit 36 starts the operation of reading the document M1 without changing the edge erase setting 49. This means that the user checks the suggestion indication 51 and selects changing the reading setup or not changing the reading setup.

As illustrated in FIG. 6, when the blank page deletion setting 50 is ON, and the use path is the second output path 20, the control unit 36 determines that the use path is not suitable for the reading setup. As a result, when the reading setup indicates that blank page deletion is to be not performed, and the use path is the second output path 20, the control unit 36 causes the display unit 35 to display the suggestion indication 51.

When the use path is the second output path 20, the function of separating documents M1 with the feed roller pair 28 is stopped, and only one document M1 is thus read. When only one document M1 is read, the possibility that the image data includes a blank page is low.

When the blank page deletion setting 50 is ON, and the use path is the second output path 20, there is no possibility that the document M1 can become damaged. For this reason, in this case, the control unit 36 causes the display unit 35 to display the suggestion indication 51 as illustrated in FIG. 7. When the YES button 52 is operated, the control unit 36 changes the blank page deletion setting 50 from ON to OFF. When the NO button 53 is operated, the control unit 36 starts the operation of reading the document M1 without changing the blank page deletion setting 50. This means that the user checks the suggestion indication 51 and selects changing the reading setup or not changing the reading setup.

As described above, when the reading setup is paired with an unsuitable use path, and the document M1 can become damaged, the control unit 36 provide a suggestion that the user should change the reading setup or the use path. When the reading setup is paired with an unsuitable use path, and there is no possibility that the document M1 can become damaged, the control unit 36 provide a suggestion that the user should change the reading setup. When a plurality of unsuitable combinations of a reading setup and a use path exist, the suggestion for change may be provided for the individual combinations one by one, or one suggestion indication 51 may provide the suggestion for all the combinations in a collective manner.

For example, the control unit 36 stores in the storage unit 37 table data of unsuitable combinations of a reading setup and a use path. The control unit 36 may store in the storage unit 37 table data of suitable combinations of a reading setup and a use path. By referring to these kinds of table data, the control unit 36 determines whether the use path is suitable for the reading setup.

Figure 8:
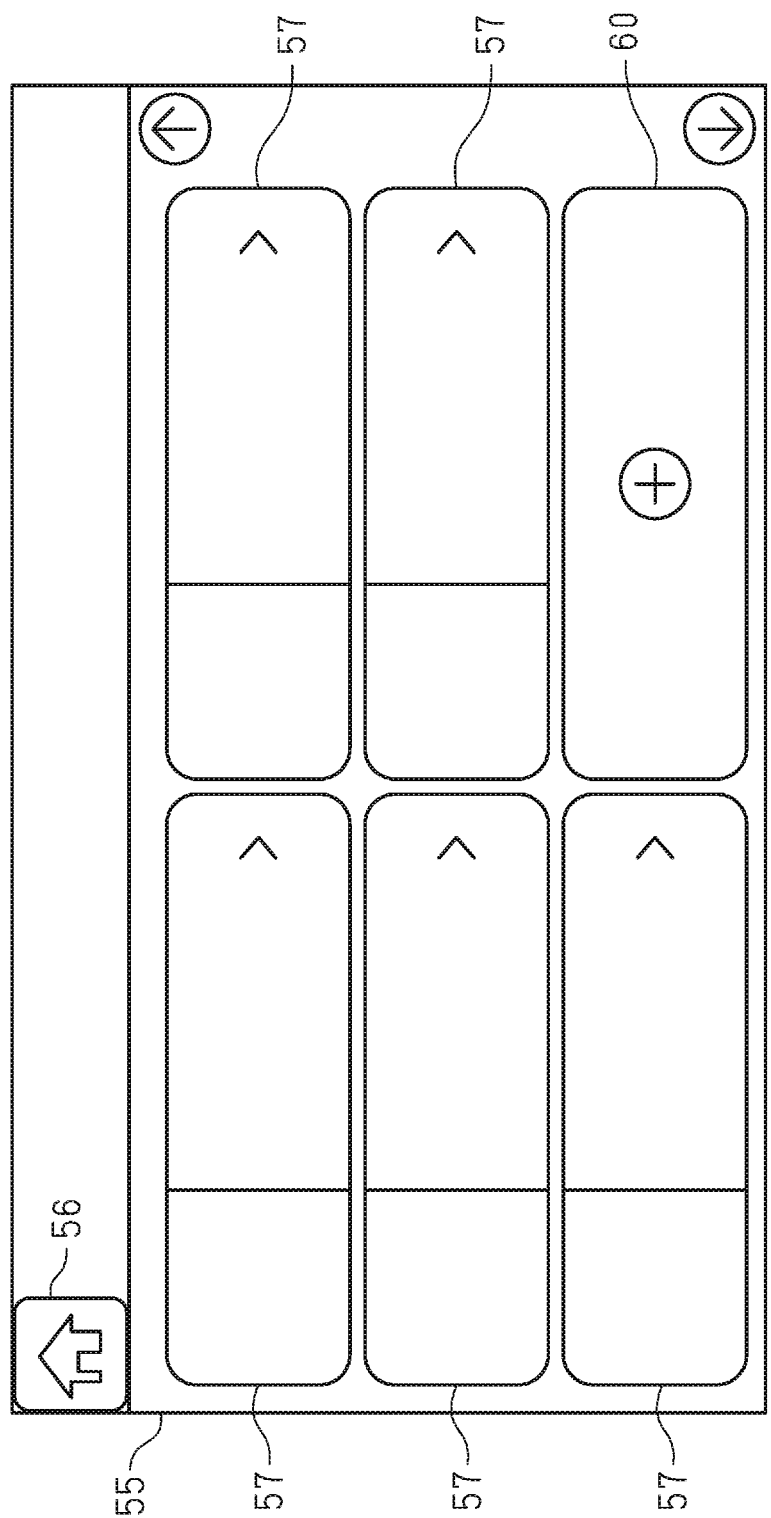
FIG. 8 schematically illustrates a list screen for providing display in the form of list.
Figure 9:
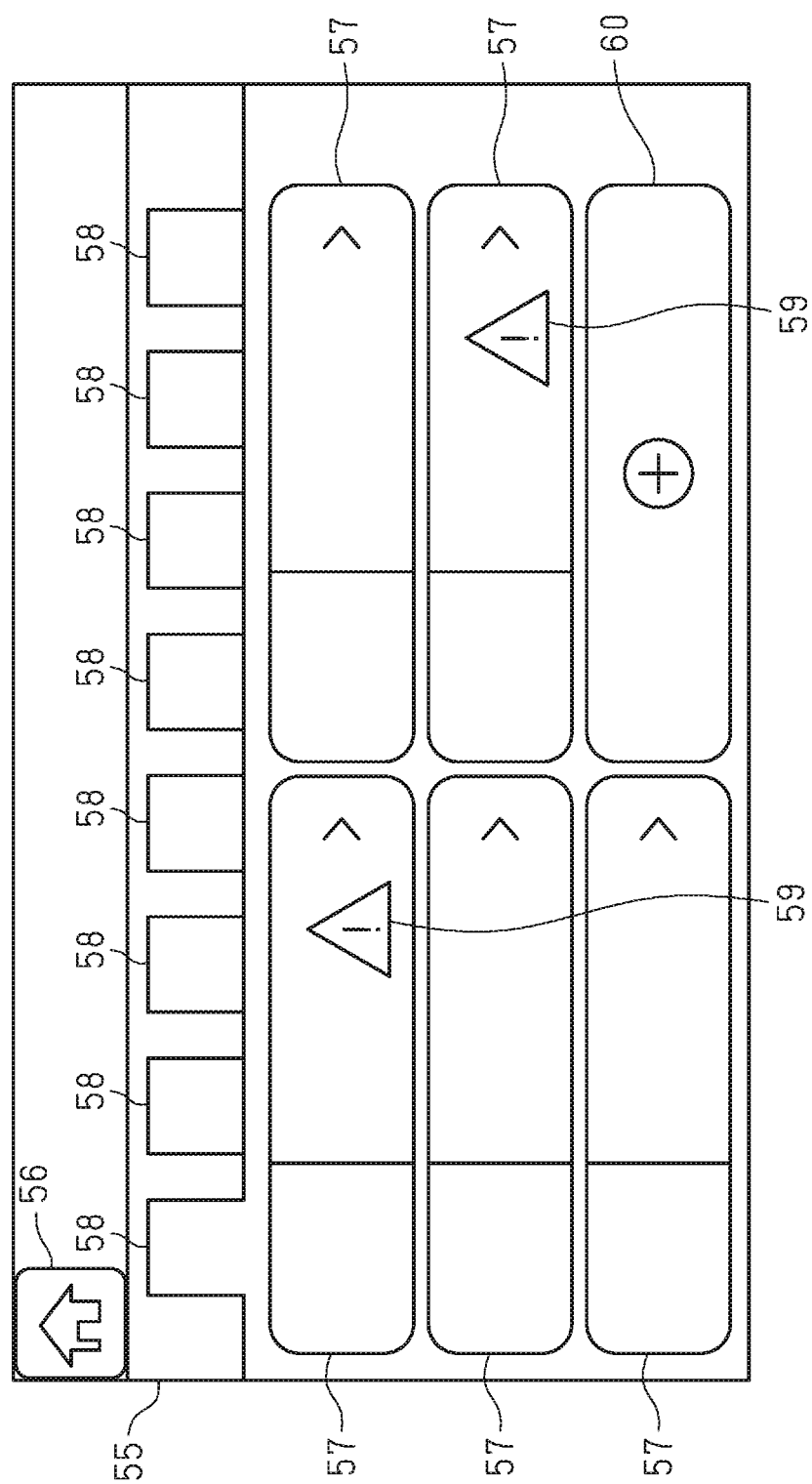
FIG. 9 schematically illustrates a list screen for providing display in the form of tab.

As illustrated in FIGS. 8 and 9, the display unit 35 displays a list screen 55. In this example, as the list screen 55, an example illustrated in FIG. 8 and an example illustrated in FIG. 9 will be described. The display unit 35 displays the list screen 55, for example, when the home screen is operated. In response to an operation by the user, the control unit 36 causes the display unit 35 to display the list screen 55. The list screen 55 is a screen for displaying a list of reading setups registered as preferences by the user. In other words, the list screen 55 displays a plurality of registered reading setups as a list. For example, a home button 56 is displayed on the list screen 55. When the home button 56 is operated, the display unit 35 displays the home screen.

A plurality of setup labels 57 are displayed on the list screen 55. The setup label 57 is a label for loading a reading setup configured as a preference by the user. When one setup label 57 is operated, a reading setup associated with the setup label 57 is loaded from the storage unit 37.

As illustrated in FIG. 8, the setup labels 57 may be displayed in the form of list on the list screen 55. In FIG. 8, the setup labels 57 are arranged from top to bottom in two columns on the list screen 55.

When the list screen 55 is to be displayed on the display unit 35, the control unit 36 may obtain path information. Based on the path information, the control unit 36 rearranges the setup labels 57. For example, the control unit 36 rearranges the setup labels 57 such that the setup label 57 representing a reading setup suitable for the use path indicated by the path information is displayed at the upper portion. For example, when the use path is the first output path 19, the control unit 36 displays the setup label 57 of the size setting 44 indicating, for example, A4 sheet or B5 sheet at the upper portion and displays the setup label 57 of the size setting 44 indicating, for example, card or booklet at the lower portion. As a result, the user can easily recognize the setup label 57 representing the reading setups suitable for the use path. The user can select the setup label 57 representing a reading setup suitable for the use path without scrolling through the list screen 55.

As illustrated in FIG. 9, the setup labels 57 may be displayed in the form of tab on the list screen 55. In FIG. 9, a plurality of tabs 58 are displayed on the list screen 55. For example, six setup labels 57 are displayed for each tab 58.

When the list screen 55 is to be displayed on the display unit 35, the control unit 36 may obtain path information. The control unit 36 displays on the list screen 55 an alert indication 59 for a reading setup unsuitable for the use path indicated by the path information. Specifically, the control unit 36 displays the alert indication 59 together with the setup label 57 representing a reading setup unsuitable for the use path. The alert indication 59 is, for example, a warning icon. As a result, the user can easily recognize the setup label 57 representing the reading setups unsuitable for the use path.

As illustrated in FIGS. 8 and 9, a new button 60 is displayed on the list screen 55. The new button 60 is a button for newly registering a setup label 57. When the new button 60 is operated, a screen for registering a reading setup is displayed on the display unit 35. The new button 60 is positioned, for example, together with the setup labels 57 on the list screen 55.

Figure 10:
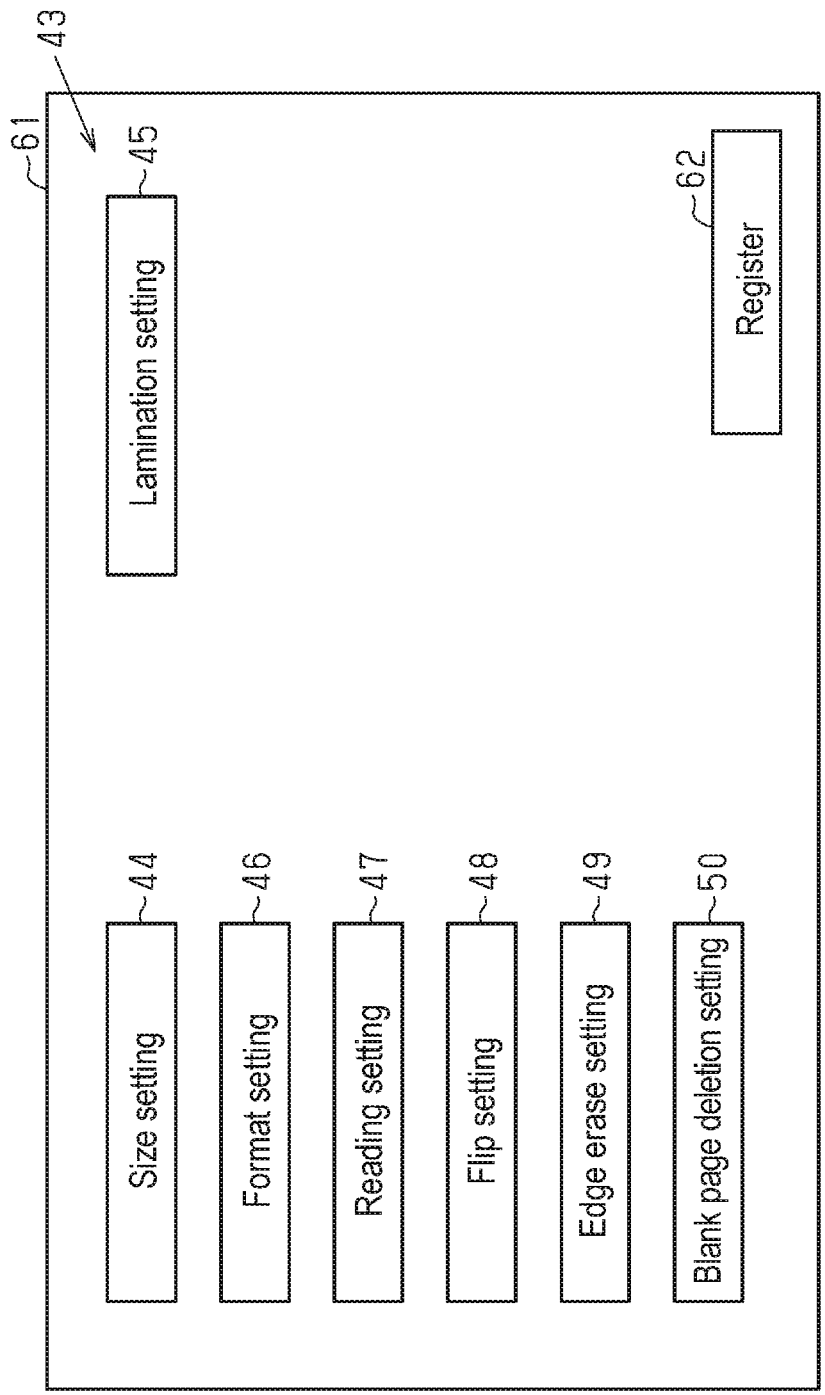
FIG. 10 schematically illustrates a registration screen.

As illustrated in FIG. 10, when the new button 60 is operated on the list screen 55, the display unit 35 displays a registration screen 61. The registration screen 61 is a screen for registering a reading setup configured as a preference by the user. In response to an operation by the user, the control unit 36 causes the display unit 35 to display the registration screen 61.

Similarly to the setup screen 41, the settings 43 are displayed on the registration screen 61. On the registration screen 61, for example, the size setting 44, the lamination setting 45, the format setting 46, the reading setting 47, the flip setting 48, the edge erase setting 49, and the blank page deletion setting 50 are displayed.

A register button 62 is displayed on the registration screen 61. When the register button 62 is operated, a reading setup configured on the registration screen 61 is registered. The details of the registered reading setup are stored in the storage unit 37. After the reading setup is registered, a corresponding setup label 57 is added to the list screen 55.

When the registration screen 61 is to be displayed on the display unit 35, the control unit 36 may obtain path information. The control unit 36 may display a reading setup suitable for the use path indicated by the path information as initial values on the registration screen 61. For example, when the use path is the first output path 19, OFF may be displayed as an initial value of the lamination setting 45. FIG. 11 presents initial values of the settings 43 displayed on the registration screen 61.

As illustrated in FIG. 11, when the use path is the first output path 19, the control unit 36 sets, for example, auto detection as an initial value of the size setting 44. When the use path is the first output path 19, the control unit 36 sets, for example, OFF as an initial value of the lamination setting 45. When the use path is the first output path 19, the control unit 36 sets, for example, single-page PDF or single-page TIFF as an initial value of the format setting 46. When the use path is the first output path 19, the control unit 36 sets, for example, both sides as an initial value of the reading setting 47. When the use path is the first output path 19, the control unit 36 sets, for example, flip vertically as an initial value of the flip setting 48. When the use path is the first output path 19, the control unit 36 sets, for example, OFF as an initial value of the edge erase setting 49. When the use path is the first output path 19, the control unit 36 sets, for example, ON as an initial value of the blank page deletion setting 50.

When the use path is the second output path 20, the control unit 36 sets, for example, card as an initial value of the size setting 44. When the use path is the second output path 20, the control unit 36 sets, for example, ON as an initial value of the lamination setting 45. When the use path is the second output path 20, the control unit 36 sets, for example, multi-page PDF or multi-page TIFF as an initial value of the format setting 46. When the use path is the second output path 20, the control unit 36 sets, for example, one side as an initial value of the reading setting 47. When the use path is the second output path 20, the control unit 36 sets, for example, flip horizontally as an initial value of the flip setting 48. When the use path is the second output path 20, the control unit 36 sets, for example, ON as an initial value of the edge erase setting 49. When the use path is the second output path 20, the control unit 36 sets, for example, OFF as an initial value of the blank page deletion setting 50.

Because the control unit 36 sets initial values of the settings 43, the user does not need to configure all the settings 43 and only needs to perform operations for necessary settings 43. This improves the convenience.

The control unit 36 stores in the storage unit 37 table data of initial values of the individual settings 43. By referring to this table data, when the registration screen 61 is displayed on the display unit 35, the control unit 36 sets the initial values about the settings 43.

Figure 12:
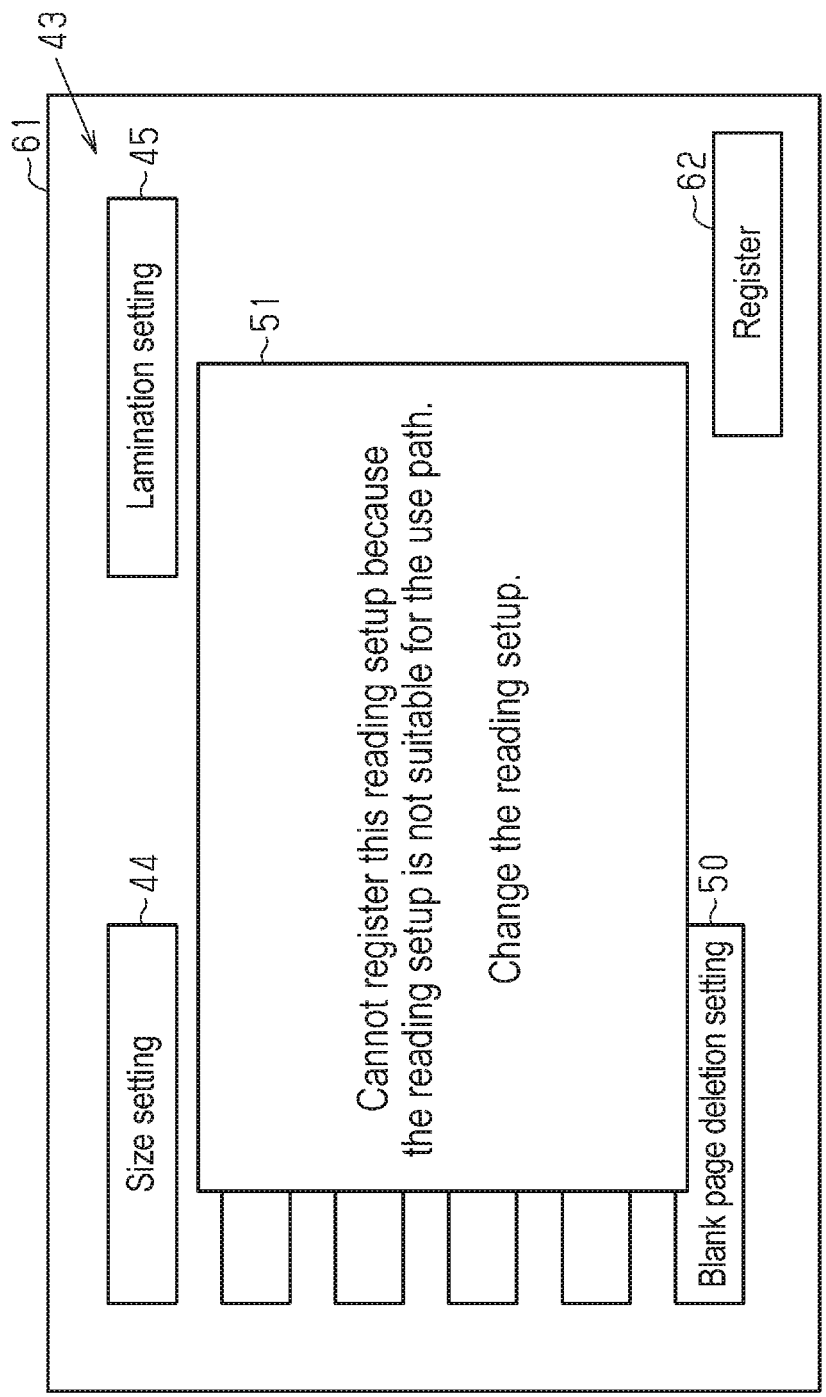
FIG. 12 schematically illustrates the registration screen with a suggestion indication when a document can become damaged.
Figure 13:
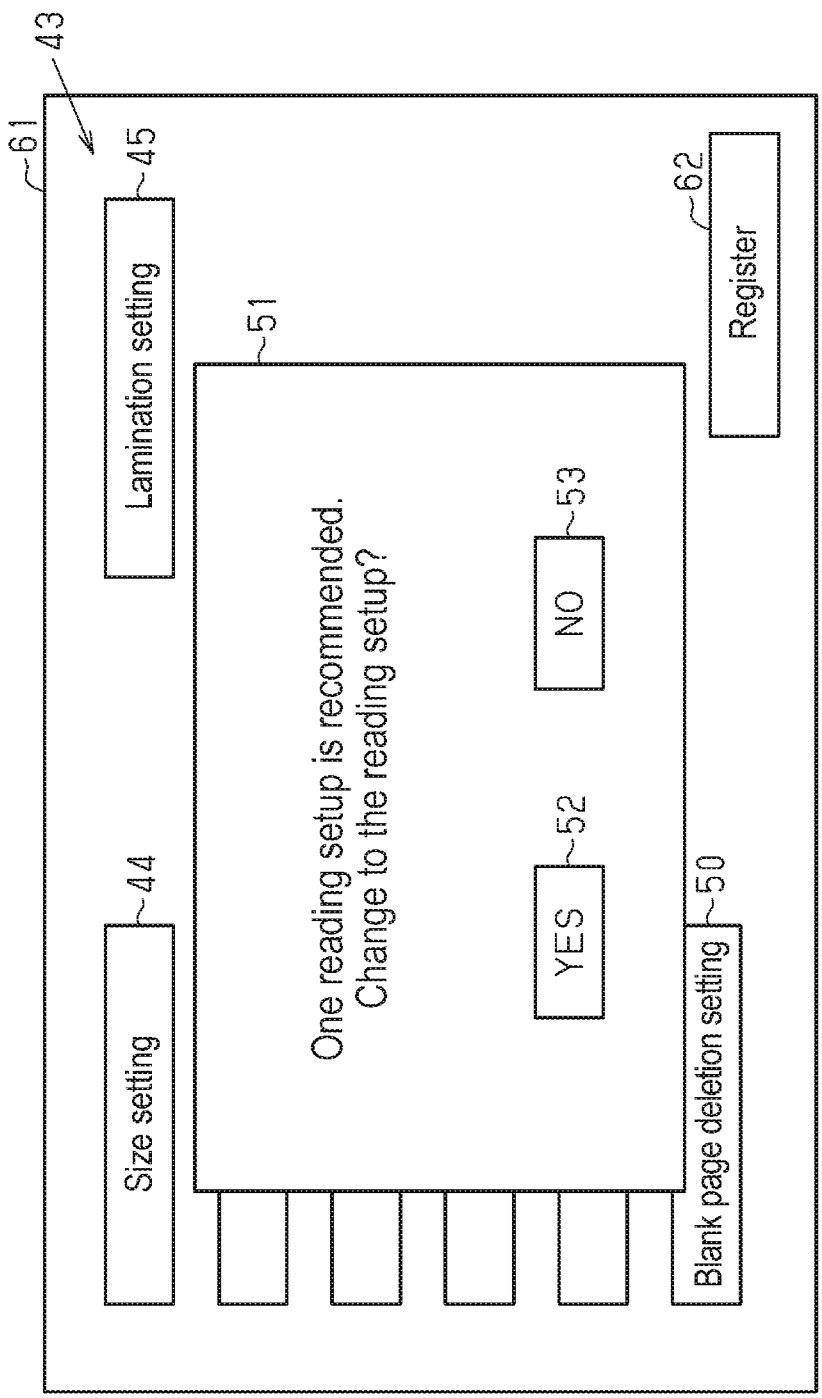
FIG. 13 schematically illustrates the registration screen with a suggestion indication when there is no possibility that a document can become damaged.

As illustrated in FIGS. 12 and 13, as the result of checking the correspondence between the reading setup configured on the registration screen 61 and the path information, the control unit 36 may cause the display unit 35 to display the suggestion indication 51. The control unit 36 checks the correspondence between the reading setup and the path information, for example, when the register button 62 is operated. When the control unit 36 determines that the use path indicated by the path information is suitable for the reading setup, the control unit 36 registers the reading setup. When the control unit 36 determines that the use path is not suitable for the reading setup, the control unit 36 causes the display unit 35 to display the suggestion indication 51. The control unit 36 causes the display unit 35 to display the suggestion indication 51, for example, such that the suggestion indication 51 is superimposed on the registration screen 61.

The timing when the control unit 36 displays the suggestion indication 51 is not necessarily when the register button 62 is operated. The control unit 36 may display the suggestion indication 51 while a reading setup is being configured on the registration screen 61. This means that while a reading setup is being configured on the registration screen 61, the control unit 36 may check the correspondence between the reading setup and the path information. When the settings 43 are changed, in other words, when the reading setup is changed, the control unit 36 may check the correspondence between the reading setup and the path information. For example, in the case in which the use path is the second output path 20, when the reading setting 47 is changed from one side to both sides on the registration screen 61, the control unit 36 causes the display unit 35 to display the suggestion indication 51. The period while a reading setup is being set on the registration screen 61 may be the period since the registration screen 61 is displayed on the display unit 35 until the user finishes registering a reading setup. For example, the period while a reading setup is being registered on the registration screen 61 includes the period since the display unit 35 changes from the list screen 55 to the registration screen 55 until the register button 62 is operated. For example, the period while a reading setup is being registered on the registration screen 61 includes the timing of performing operations with the settings 43 on the registration screen 61.

As illustrated in FIG. 12, when a reading setup is paired with an unsuitable use path, and the document M1 can become damaged, the control unit 36 causes the display unit 35 to display the suggestion indication 51. When the document M1 can become damaged, the control unit 36 prohibits registration of the reading setup. With the suggestion indication 51, the control unit 36 suggests changing the reading setup to the user.

As illustrated in FIG. 13, a reading setup is paired with an unsuitable use path, and there is no possibility that the document M1 can become damaged, the control unit 36 causes the display unit 35 to display the suggestion indication 51. When there is no possibility that the document M1 can become damaged, the control unit 36 suggests changing the reading setup to the user. When the YES button 52 is operated, the control unit 36 changes the reading setup to a recommended reading setup. When the NO button 53 is operated, the control unit 36 registers the reading setup without changing the reading setup.

Flowcharts

The following describes processes performed by the control unit 36. The control unit 36 performs a configuration process, a rearrangement process, an alert process, and a registration process by running the program 38.

Figure 14:
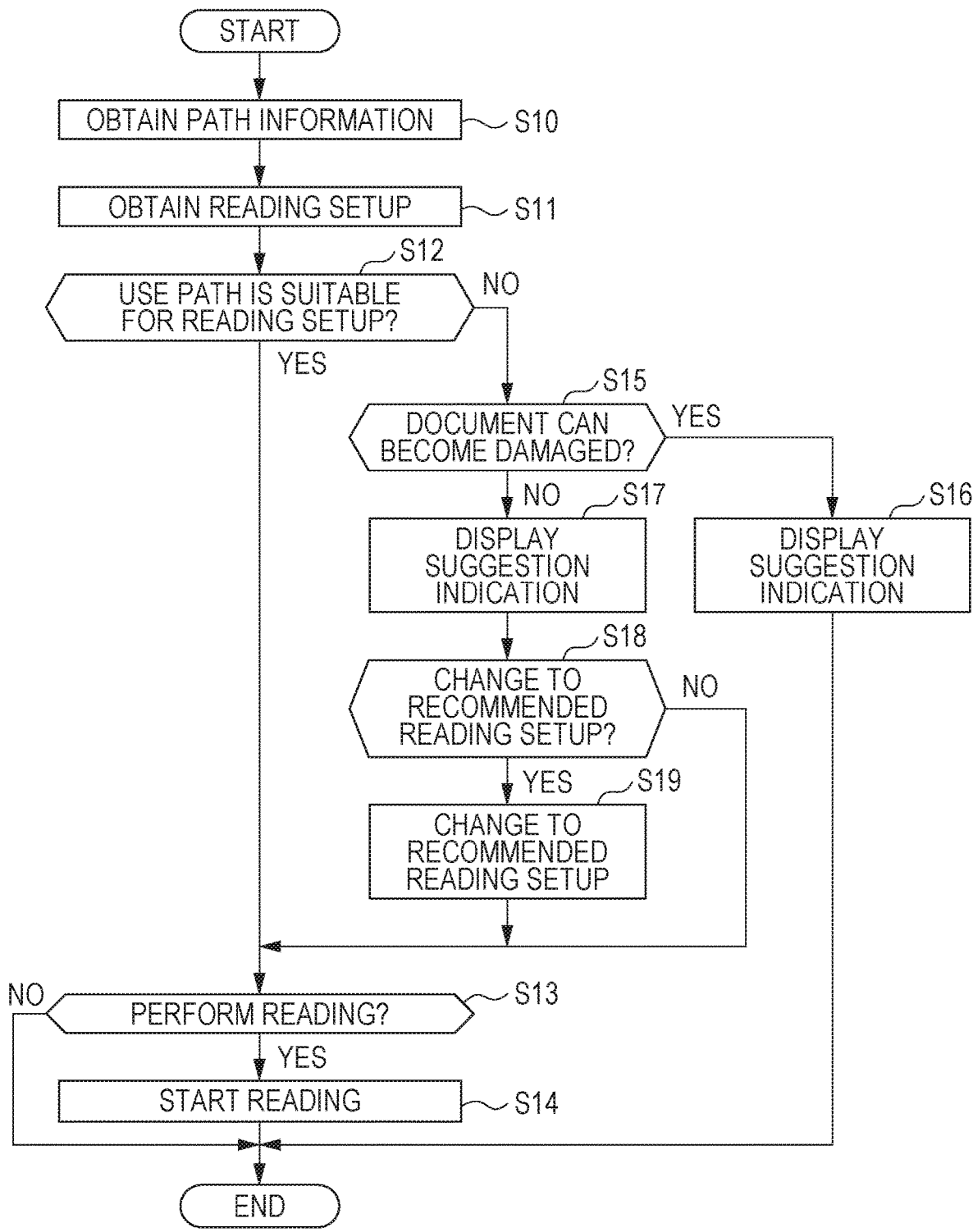
FIG. 14 is a flowchart illustrating a configuration process performed by a control unit.

Firstly, the configuration process will be described. When the start button 42 is operated on the setup screen 41, the control unit 36 performs the configuration process as illustrated in FIG. 14. The control unit 36 may perform the configuration process when the reading setup is changed on the setup screen 41.

As illustrated in FIG. 14, in step S10, the control unit 36 obtains path information. At this time, the control unit 36 obtains path information from the first path sensor 23 and the second path sensor 24.

In step S11, the control unit 36 obtains a reading setup. At this time, the control unit 36 obtains the reading setup configured on the setup screen 41. In step S12, the control unit 36 determines whether the use path is suitable for the reading setup. At this time, based on the use path indicated by the path information obtained in step S11 and the reading setup obtained in step S12, the control unit 36 determines whether the use path is suitable for the reading setup. When the control unit 36 determines that the use path is suitable for the reading setup, the control unit 36 causes the process to proceed to step S13. When the control unit 36 determines that the use path is not suitable for the reading setup, the control unit 36 causes the process to proceed to step S15.

In step S13, the control unit 36 determines whether to start the operation of reading the document M1. At this time, the control unit 36 determines, for example, whether the timing when the configuration process is started is when the start button 42 is operated. When the control unit 36 determines that the configuration process is started when the start button 42 is operated, the control unit 36 causes the process to proceed to step S14. When the control unit 36 determines that the configuration process is started, for example, when the reading setup is changed, the control unit 36 ends the configuration process.

In step S14, the control unit 36 starts the operation of reading the document M1. At this time, the control unit 36 performs the operation of reading the document M1 in accordance with the reading setup obtained in step S11. When the operation of reading the document M1 is completed, the control unit 36 ends the configuration process.

In step S15, the control unit 36 determines whether the document M1 can become damaged. At this time, the control unit 36 determines whether the reading setup is paired with an unsuitable use path, and the document M1 can become damaged. When the control unit 36 determines that the document M1 can become damaged, the control unit 36 causes the process to proceed to step S16. When the control unit 36 determines that there is no possibility that the document M1 can become damaged, the control unit 36 causes the process to proceed to step S17.

In step S16, the control unit 36 displays the suggestion indication 51. At this time, because the document M1 can become damaged, the control unit 36 displays the suggestion indication 51 as illustrated in FIG. 5. After the operation in step S16 is completed, the control unit 36 ends the configuration process. This is because when the document M1 can become damaged, reading of the document M1 is prohibited until the reading setup or the use path is changed.

In step S17, the control unit 36 displays the suggestion indication 51. At this time, because there is no possibility that the document M1 can become damaged, the control unit 36 displays the suggestion indication 51 having the YES button 52 and the NO button 53 as illustrated in FIG. 7.

In step S18, the control unit 36 determines whether to change the reading setup to a recommended reading setup. At this time, the control unit 36 determines whether the YES button 52 or the NO button 53 is operated. When the YES button 52 is operated, the control unit 36 determines to change the reading setup to the recommended reading setup. In this case, the control unit 36 causes the process to proceed to step S19. When the NO button 53 is operated, the control unit 36 determines not to change the reading setup to the recommended reading setup. In this case, the control unit 36 causes the process to proceed to step S13.

In step S19, the control unit 36 changes the reading setup to the recommended reading setup. After the control unit 36 changes the reading setup to the recommended reading setup, the control unit 36 causes the process to proceed to step S13. As described above, the method of controlling the reading apparatus 11 includes obtaining path information indicating the use path. The method of controlling the reading apparatus 11 includes displaying the suggestion indication 51 based on the reading setup and the path information.

Next, the rearrangement process will be described. When the control unit 36 causes the display unit 35 to display the list screen 55 presenting the setup labels 57 in the form of list, the control unit 36 performs the rearrangement process as illustrated in FIG. 15.

Figure 15:
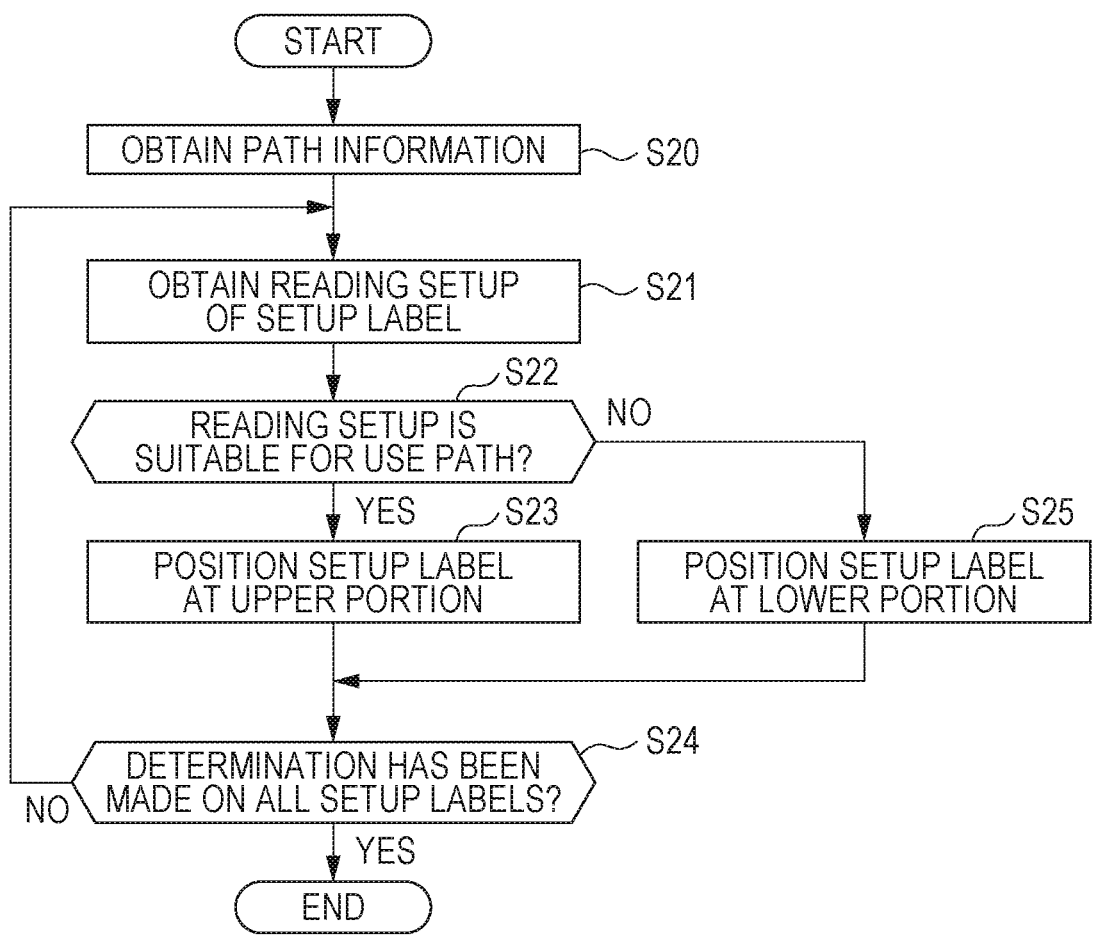
FIG. 15 is a flowchart illustrating a rearrangement process performed by the control unit.

As illustrated in FIG. 15, in step S20, the control unit 36 obtains path information. At this time, the control unit 36 obtains path information from the first path sensor 23 and the second path sensor 24.

In step S21, the control unit 36 obtains the reading setups of the setup labels 57. Specifically, in step S21, the control unit 36 obtains details of the reading setups associated with the setup labels 57.

In step S22, the control unit 36 determines whether a reading setup is suitable for a use path. At this time, the control unit 36 checks the correspondences between the use path indicated by the path information obtained in step S20 and the reading setups obtained in step S21. When the control unit 36 determines that a reading setup is suitable for the use path, the control unit 36 causes the process to proceed to step S23. When the control unit 36 determines that a reading setup is not suitable for the use path, the control unit 36 causes the process to proceed to step S25.

In step S23, the control unit 36 positions a setup label 57 at the upper portion. Specifically, the control unit 36 positions the setup label 57 associated with the reading setup suitable for the use path at the upper portion on the list screen 55.

In step S24, the control unit 36 determines whether determination has been made for all the setup labels 57. When the control unit 36 determines that determination has been made for all the setup labels 57, the control unit 36 ends the rearrangement process. When the control unit 36 determines that determination has not been made for all the setup labels 57, the control unit 36 causes the process to return to step S21.

In step S25, the control unit 36 positions a setup label 57 at the lower portion. Specifically, the control unit 36 positions the setup label 57 associated with the reading setup unsuitable for the use path at the lower portion on the list screen 55. After the control unit 36 completes the operation in step S25, the control unit 36 causes the process to proceed to step S24.

Figure 16:
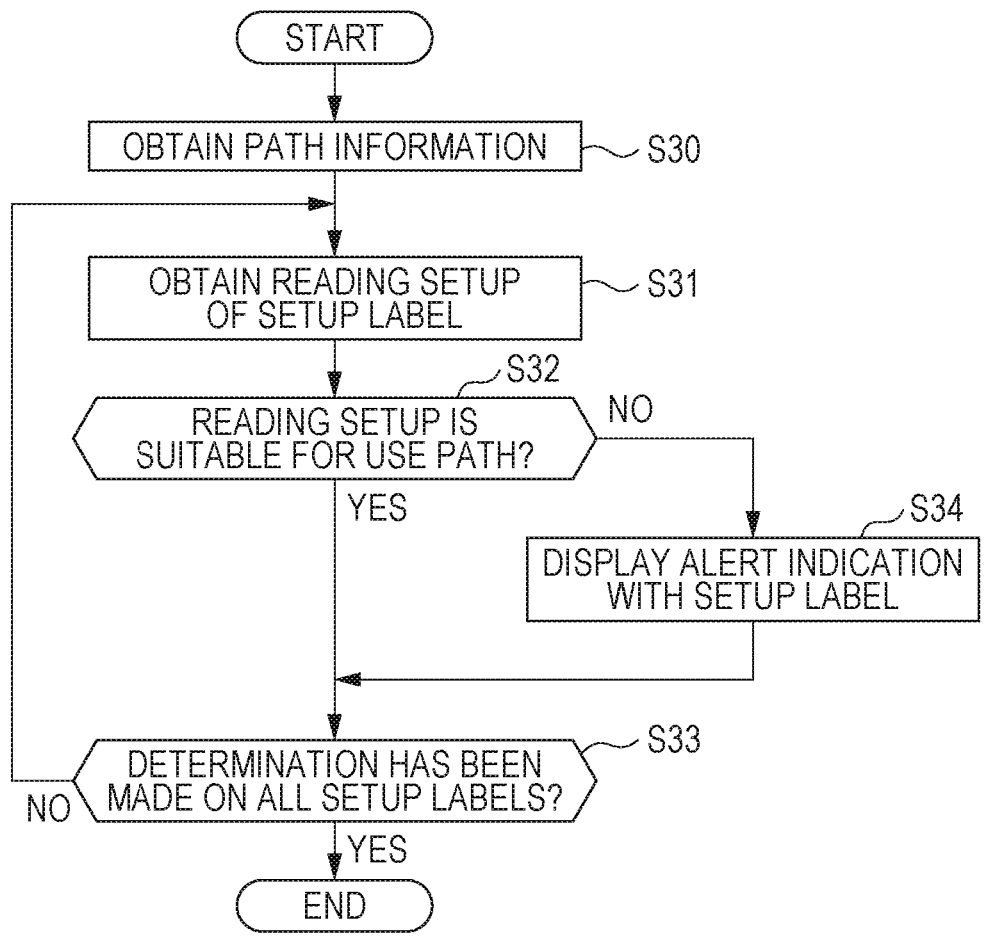
FIG. 16 is a flowchart illustrating an alert process performed by the control unit.

Next, the alert process will be described. When the control unit 36 causes the display unit 35 to display the list screen 55 presenting the setup labels 57 in the form of tab, the control unit 36 performs the alert process as illustrated in FIG. 16. As illustrated in FIG. 16, in step S30, the control unit 36 obtains path information. At this time, the control unit 36 obtains path information from the first path sensor 23 and the second path sensor 24.

In step S31, the control unit 36 obtains the reading setups of the setup labels 57. Specifically, in step S31, the control unit 36 obtains details of the reading setups associated with the setup labels 57.

In step S32, the control unit 36 determines whether a reading setup is suitable for a use path. At this time, the control unit 36 checks the correspondences between the use path indicated by the path information obtained in step S30 and the reading setups obtained in step S31. When the control unit 36 determines that a reading setup is suitable for the use path, the control unit 36 causes the process to proceed to step S33. When the control unit 36 determines that a reading setup is not suitable for the use path, the control unit 36 causes the process to proceed to step S34.

In step S33, the control unit 36 determines whether determination has been made for all the setup labels 57. When the control unit 36 determines that determination has been made for all the setup labels 57, the control unit 36 ends the alert process. When the control unit 36 determines that determination has not been made for all the setup labels 57, the control unit 36 causes the process to return to step S31.

In step S34, the control unit 36 displays the alert indication 59 together with a setup label 57. Specifically, the control unit 36 displays the alert indication 59 together with the setup label 57 associated with the reading setup unsuitable for the use path. After the control unit 36 completes the operation in step S34, the control unit 36 causes the process to proceed to step S33.

Figure 17:
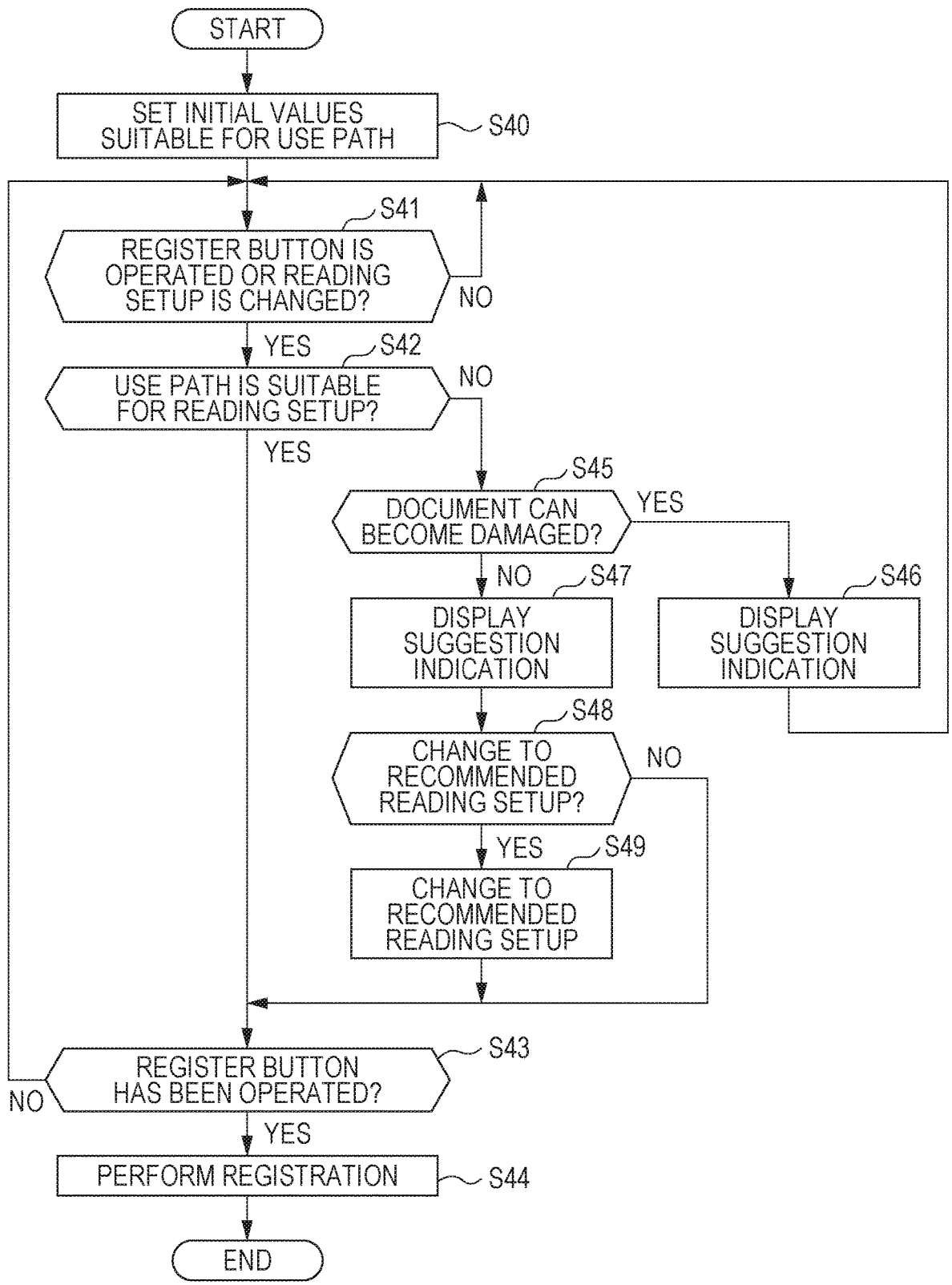
FIG. 17 is a flowchart illustrating a registration process performed by the control unit.

Next, the registration process will be described. When the control unit 36 displays the registration screen 61, the control unit 36 performs the registration process as illustrated in FIG. 17. When the registration screen 61 is displayed, the list screen 55 has been displayed, and thus, the control unit 36 has obtained path information.

As illustrated in FIG. 17, in step S40, the control unit 36 sets initial values suitable for the use path. At this time, the control unit 36 sets initial values suitable for the use path indicated by the path information previously obtained as the settings 43 on the registration screen 61.

In step S41, the control unit 36 determines whether the register button 62 is operated or the reading setup is changed. When the control unit 36 determines that the register button 62 is operated or the reading setup is changed, the control unit 36 causes the process to proceed to step S42. When the control unit 36 determines that the register button 62 is not operated and the reading setup is not changed, the control unit 36 repeats the operation in step S41. This means that in response to the register button 62 being operated or change of the reading setup, the control unit 36 causes the process to proceed from step S41 to step S42.

In step S42, the control unit 36 determines whether the use path is suitable for the reading setup. At this time, the control unit 36 checks the correspondence between the use path indicated by the path information previously obtained and the configured reading setup on the registration screen 61. When the control unit 36 determines that the use path is suitable for the reading setup, the control unit 36 causes the process to proceed to step S43. When the control unit 36 determines that the use path is not suitable for the reading setup, the control unit 36 causes the process to proceed to step S45.

In step S43, the control unit 36 determines whether the register button 62 has been operated. At this time, the control unit 36 determines whether the register button 62 has been operated in step S41. When the control unit 36 determines that the register button 62 has been operated, the control unit 36 causes the process to proceed to step S44. When the control unit 36 determines that the register button 62 has not been operated, the control unit 36 causes the process to return to step S41.

In step S44, the control unit 36 performs an operation of registering the reading setup. As a result, one setup label 57 is added to the list screen 55. After the operation in step S44 is completed, the control unit 36 ends the registration process.

In step S45, the control unit 36 determines whether the document M1 can become damaged. At this time, the control unit 36 determines whether the reading setup is paired with an unsuitable use path, and the document M1 can become damaged. When the control unit 36 determines that the document M1 can become damaged, the control unit 36 causes the process to proceed to step S46. When the control unit 36 determines that there is no possibility that the document M1 can become damaged, the control unit 36 causes the process to proceed to step S47.

In step S46, the control unit 36 displays the suggestion indication 51. At this time, because the document M1 can become damaged, the control unit 36 displays the suggestion indication 51 as illustrated in FIG. 12. After the control unit 36 completes the operation in step S46, the control unit 36 causes the process to return to step S41. This is because when the document M1 can become damaged, registering the reading setup is prohibited.

In step S47, the control unit 36 displays the suggestion indication 51. At this time, because there is no possibility that the document M1 can become damaged, the control unit 36 displays the suggestion indication 51 having the YES button 52 and the NO button 53 as illustrated in FIG. 13.

In step S48, the control unit 36 determines whether to change the reading setup to a recommended reading setup.

At this time, the control unit 36 determines whether the YES button 52 or the NO button 53 is operated. When the YES button 52 is operated, the control unit 36 determines to change the reading setup to the recommended reading setup. In this case, the control unit 36 causes the process to proceed to step S49. When the NO button 53 is operated, the control unit 36 determines not to change the reading setup to the recommended reading setup. In this case, the control unit 36 causes the process to proceed to step S43.

In step S49, the control unit 36 changes the reading setup to the recommended reading setup. After the control unit 36 changes the reading setup to the recommended reading setup, the control unit 36 causes the process to proceed to step S43.

Effects and Advantages

The following describes effects and advantages of the embodiment described above.

(1) The control unit 36 obtains path information indicating a use path and, based on a reading setup and the path information, causes the display unit 35 to display the suggestion indication 51 for suggesting changing the reading setup or suggesting changing the use path.

With this configuration, for example, when the use path is not suitable for the reading setup, the control unit 36 causes the display unit 35 to display the suggestion indication 51. By checking the suggestion indication 51, the user can recognize a use path suitable for the reading setup or a reading setup suitable for the use path. The user changes the reading setup or the use path in accordance with the information of the suggestion indication 51, and as a result, the document M1 is outputted by using the use path suitable for the reading setup.

(2) In response to receiving an instruction to start reading the document M1, the control unit 36 checks the correspondence between the reading setup and the path information; when the control unit 36 determines that the use path is not suitable for the reading setup, the control unit 36 causes the display unit 35 to display the suggestion indication 51.

With this configuration, before reading of the document M1 is started, it is possible to cause the display unit 35 to display the suggestion indication 51. In this case, a suggestion that the user should change the reading setup or the use path can be provided for the user earlier than if the suggestion indication 51 is displayed after reading of the document M1 is completed.

(3) While a reading setup is being configured on the setup screen 41, the control unit 36 checks the correspondence between the reading setup and the path information; when the control unit 36 determines that the use path is not suitable for the reading setup, the control unit 36 causes the display unit 35 to display the suggestion indication 51.

With this configuration, while a reading setup is being configured, it is possible to cause the display unit 35 to display the suggestion indication 51. In this case, a suggestion that the user should change the reading setup or the use path can be provided for the user earlier than if the suggestion indication 51 is displayed after the reading setup has been configured.

(4) The control unit 36 causes the display unit 35 to display the registration screen 61 for registering a reading setup. While the reading setup is being configured on the registration screen 61, the control unit 36 checks the correspondence between the reading setup and the path information; when the control unit 36 determines that the use path is not suitable for the reading setup, the control unit 36 causes the display unit 35 to display the suggestion indication 51.

With this configuration, while a reading setup is being configured on the registration screen 61, it is possible to display the suggestion indication 51. In this case, a suggestion that the user should change the reading setup or the use path can be provided for the user earlier than if the suggestion indication 51 is displayed after the reading setup has been configured on the registration screen 61.

(5) When the control unit 36 causes the display unit 35 to display the registration screen 61, the control unit 36 displays a reading setup suitable for path information as initial values on the registration screen 61. With this configuration, a reading setup suitable for the present use path is displayed as initial values on the registration screen 61. This improves the convenience of using the registration screen 61.

(6) The control unit 36 causes the display unit 35 to display the list screen 55 displaying a plurality of registered reading setups as a list. Based on path information, the control unit 36 rearranges the reading setups displayed on the list screen 55.

With this configuration, of the registered reading setups, priority in display on the list screen 55 is given to a reading setup suitable for the present use path. As a result, the user can easily select a reading setup suitable for the use path.

(7) The control unit 36 causes the display unit 35 to display the list screen 55 displaying a plurality of registered reading setups as a list. The control unit 36 displays on the list screen 55 the alert indication 59 for a reading setup unsuitable for the use path indicated by path information.

With this configuration, of the registered reading setups, the alert indication 59 is displayed on the list screen 55 together with a reading setup unsuitable for the present use path. As a result, the user can easily avoid a reading setup unsuitable for the use path.

(8) The reading setup includes the setting 43 indicating whether the document M1 is laminated. When the reading setup indicates that the document M1 is laminated, and the use path is the first output path 19, the control unit 36 causes the display unit 35 to display the suggestion indication 51.

When the document M1 is laminated, the document M1 can become damaged while being curved. For this reason, when the document M1 is laminated, it is desirable that the document M1 be outputted along the second output path 20.

This configuration reduces the possibility that the laminated document M1 can be outputted through the first output path 19. For example, the user views the suggestion indication 51 and changes the use path from the first output path 19 to the second output path 20. The document M1 is consequently outputted through a path suitable for the reading setup.

(9) The reading setup includes the setting 43 indicating whether the document M1 is a card or booklet. When the reading setup indicates that the document M1 is a card or booklet, and the use path is the first output path 19, the control unit 36 causes the display unit 35 to display the suggestion indication 51.

When the document M1 is a card, the document M1 can become damaged while being curved. When the document M1 is a booklet, the document M1 can cause a jam while being curved. For this reason, when the document M1 is a card or booklet, it is desirable that the document M1 be outputted along the second output path 20.

This configuration reduces the possibility that the document M1 of a card or booklet can be outputted through the first output path 19. For example, the user views the suggestion indication 51 and changes the use path from the first output path 19 to the second output path 20. The document M1 is consequently outputted through a path suitable for the reading setup.

(10) The reading setup includes the setting 43 indicating whether both sides of the document M1 are to be read. When the reading setup indicates that both sides of the document M1 are to be read, and the use path is the second output path 20, the control unit 36 causes the display unit 35 to display the suggestion indication 51.

For example, when the document M1 is laminated, the document M1 can become damaged while being curved. For example, when the document M1 is a card, the document M1 can become damaged while being curved. For example, when the document M1 is a booklet, the document M1 can cause a jam while being curved. For these reasons, it is desirable that the document M1 of these kinds be outputted along the second output path 20. Thus, for the first output path 19, the type of the document M1 is limited; by contrast, for the second output path 20, the type of the document M1 is not limited.

When the document M1 is laminated, or the document M1 is a card or booklet, reading of both sides of the document M1 is not needed more often than when the document M1 is a normal sheet. With this configuration, when the document M1 suitable for the second output path 20 is read, the possibility of reading both sides of the document M1 is reduced.

(11) The reading setup includes the setting 43 indicating whether a particular image processing operation is to be performed on image data of the document M1 read by the reading unit 31, that is, the first setting. The control unit 36 checks the correspondence between the reading setup including the first setting and the path information; when the control unit 36 determines that the use path is not suitable for the first setting, the control unit 36 causes the display unit 35 to display the suggestion indication 51. With this configuration, image processing is performed appropriately to the use path.

(12) The reading setup includes the setting 43 indicating a format for outputting image data of the document M1 read by the reading units 31, that is, the second setting. The control unit 36 checks the correspondence between the reading setup including the second setting and the path information; when the control unit 36 determines that the use path is not suitable for the second setting, the control unit 36 causes the display unit 35 to display the suggestion indication 51. With this configuration, image data is outputted in a format appropriate to the use path.

(13) When the casing 12 is in the first position, the use path is changed to the first output path 19; when the casing 12 is in the second position, the use path is changed to the second output path 20. With this configuration, the use path is changed in accordance with the position of the casing 12. As a result, the user can easily change the use path.

Modifications

The present embodiment can be modified as described below. The present embodiment and the following modifications may be combined in any combination when there is no technical contradiction.

The program 38 may be installed in, for example, the computer 39. For example, the computer 39 may control the reading apparatus 11. The program 38 can cause the computer 39 to obtain path information from the reading apparatus 11 and to display the suggestion indication 51 based on the reading setup and the path information. In this case, the computer 39 as an external device and the reading apparatus 11 constitute an image reading system. The computer 39 also operates as an external control unit. The computer 39 thus includes an external control unit. The external control unit obtains path information and a reading setup from the reading apparatus 11. The external control unit displays the suggestion indication 51 based on the reading setup and path information. At this time, the external control unit may cause a device other than the reading apparatus 11 and the external device to display the suggestion indication 51.

The reading apparatus 11 may include a drive unit for changing the position of the casing 12. The drive unit is, for example, a motor. The drive unit drives the casing 12 to rotate. As a result, the position of the casing 12 is changed. The drive unit automatically changes the position of the casing 12.

The reading apparatus 11 may be configured such that the use path can be changed using the setup screen 41. In this case, the control unit 36 changes the use path. For example, the control unit 36 causes the drive unit such as a motor to change the position of the switching member 22 so as to change the use path.

Technical Ideas

The following describes technical ideas and their effects and advantages that can be understood from the embodiment and modifications described above.

(A) A reading apparatus includes a reading unit configured to read a document, a transport path for transporting the document to the reading unit, an output path for outputting the document read by the reading unit, a display unit configured to display a setup screen for configuring a reading setup about document reading, and a control unit configured to control the reading unit and the display unit. The output path includes a first output path and a second output path that separately lead to different document output destinations, and the output path is formed such that a use path used to output the document is changed between the first output path and the second output path. The control unit is configured to obtain path information indicating the use path. The control unit is configured to, based on the reading setup and the path information, cause the display unit to display a suggestion indication suggesting changing the reading setup or suggesting changing the use path.

With this configuration, for example, when the use path is not suitable for the reading setup, the control unit causes the display unit to display the suggestion indication. By checking the suggestion indication, the user can recognize a use path suitable for the reading setup or a reading setup suitable for the use path. The user changes the reading setup or the use path in accordance with the information of the suggestion indication, and as a result, the document is outputted by using the use path suitable for the reading setup.

(B) In the reading apparatus described above, the control unit may be configured to, in response to receiving an instruction to start document reading, check correspondence between the reading setup and the path information, and when determining that the use path is not suitable for the reading setup, cause the display unit to display the suggestion indication.

With this configuration, before reading of the document is started, it is possible to cause the display unit to display the suggestion indication. In this case, a suggestion that the user should change the reading setup or the use path can be provided for the user earlier than if the suggestion indication is displayed after reading of the document is completed.

(C) In the reading apparatus described above, the control unit may be configured to check correspondence between the reading setup and the path information while the reading setup is being configured on the setup screen, and when determining that the use path is not suitable for the reading setup, cause the display unit to display the suggestion indication.

With this configuration, while a reading setup is being configured, it is possible to cause the display unit to display the suggestion indication. In this case, a suggestion that the user should change the reading setup or the use path can be provided for the user earlier than if the suggestion indication is displayed after the reading setup has been configured.

(D) In the reading apparatus described above, the control unit may be configured to cause the display unit to display a registration screen for registering the reading setup, check correspondence between the reading setup and the path information while the reading setup is being configured on the registration screen, and when determining that the use path is not suitable for the reading setup, cause the display unit to display the suggestion indication.

With this configuration, while the reading setup is being configured on the registration screen, it is possible to display the suggestion indication. In this case, a suggestion that the user should change the reading setup or the use path can be provided for the user earlier than if the suggestion indication is displayed after the reading setup has been configured on the registration screen.

(E) In the reading apparatus described above, the control unit may be configured to, when causing the display unit to display the registration screen, cause the display unit to display on the registration screen the reading setup suitable for the path information as an initial value. With this configuration, a reading setup suitable for the present use path is displayed as initial values on the registration screen. This improves the convenience of using the registration screen.

(F) In the reading apparatus described above, the control unit may be configured to, when the reading setup is one of a plurality of reading setups registered, cause the display unit to display a list screen displaying the plurality of reading setups as a list, and based on the path information, reposition the plurality of reading setups displayed on the list screen.

With this configuration, of the registered reading setups, priority in display on the list screen is given to a reading setup suitable for the present use path. As a result, the user can easily select a reading setup suitable for the use path.

(G) In the reading apparatus described above, the control unit may be configured to, when the reading setup is one of a plurality of reading setups registered, cause the display unit to display a list screen displaying the plurality of reading setups as a list and cause the display unit to display on the list screen an alert indication for the reading setup unsuitable for the use path indicated by the path information.

With this configuration, of the registered reading setups, the alert indication is displayed on the list screen together with a reading setup unsuitable for the present use path. As a result, the user can easily avoid a reading setup unsuitable for the use path.

(H) In the reading apparatus described above, in the first output path, the document may be curved and outputted; in the second output path, the document may be outputted without being curved; the reading setup may include a setting indicating whether the document is laminated; and the control unit may be configured to, when the reading setup indicates that the document is laminated and that the use path is the first output path, cause the display unit to display the suggestion indication.

When the document is laminated, the document can become damaged while being curved. For this reason, when the document is laminated, it is desirable that the document be outputted along the second output path.

This configuration reduces the possibility that the laminated document can be outputted through the first output path. For example, the user views the suggestion indication and changes the use path from the first output path to the second output path. The document is consequently outputted through a path suitable for the reading setup.

(I) In the reading apparatus described above, in the first output path, the document may be curved and outputted; in the second output path, the document may be outputted without being curved; the reading setup may include a setting indicating whether the document is a card or booklet; and the control unit may be configured to, when the reading setup indicates that the document is a card or booklet and that the use path is the first output path, cause the display unit to display the suggestion indication.

When the document is a card, the document can become damaged while being curved. When the document is a booklet, the document can cause a jam while being curved. For this reason, when the document is a card or booklet, it is desirable that the document be outputted along the second output path.

This configuration reduces the possibility that the document of a card or booklet can be outputted through the first output path. For example, the user views the suggestion indication and changes the use path from the first output path to the second output path. The document is consequently outputted through a path suitable for the reading setup.

(J) In the reading apparatus described above, in the first output path, the document may be curved and outputted; in the second output path, the document may be outputted without being curved; the reading setup may include a setting indicating whether both sides of the document are to be read; and the control unit may be configured to, when the reading setup indicates that both sides of the document are to be read and that the use path is the second output path, cause the display unit to display the suggestion indication.

For example, when the document is laminated, the document can become damaged while being curved. For example, when the document is a card, the document can become damaged while being curved. For example, when the document is a booklet, the document can cause a jam while being curved. For these reasons, it is desirable that the document of these kinds be outputted along the second output path. Thus, for the first output path, the type of the document is limited; by contrast, for the second output path, the type of the document is not limited.

When the document is laminated, or the document is a card or booklet, reading of both sides of the document is not needed more often than when the document is a normal sheet. With this configuration, when the document suitable for the second output path is read, the possibility of reading both sides of the document is reduced.

(K) In the reading apparatus described above, in the first output path, the document may be curved and outputted; in the second output path, the document may be outputted without being curved; the reading setup may include a first setting indicating whether a particular image processing operation is to be performed on image data of the document read by the reading unit; and the control unit may be configured to check correspondence between the first setting and the path information, and when determining that the use path is not suitable for the first setting, cause the display unit to display the suggestion indication. With this configuration, image processing is performed appropriately to the use path.

(L) In the reading apparatus described above, in the first output path, the document may be curved and outputted; in the second output path, the document may be outputted without being curved; the reading setup may include a second setting indicating a format for outputting image data of the document read by the reading unit; and the control unit may be configured to check correspondence between the second setting and the path information, and when determining that the use path is not suitable for the second setting, cause the display unit to display the suggestion indication. With this configuration, image data is outputted in a format appropriate to the use path.

(M) The reading apparatus described above may include a casing containing the reading unit and a supporting member supporting the casing. The casing may be configured such that the position of the casing is changed between a first position and a second position; the tilt angle relative to a mounting surface having the supporting member may differ between the first position and the second position. When the casing is in the first position, the use path may be changed to the first output path. When the casing is in the second position, the use path may be changed to the second output path. With this configuration, the use path is changed in accordance with the position of the casing. As a result, the user can easily change the use path.

(N) A method of controlling a reading apparatus configured such that a use path used to output a document read by a reading unit is changed between a first output path and a second output path, includes obtaining path information indicating the use path, and based on a reading setup about document reading and the path information, displaying a suggestion indication suggesting changing the reading setup or suggesting changing the use path. With this configuration, the same advantages as the reading apparatus described above are achieved.

(O) A program is configured to control a reading apparatus configured such that a use path used to output a document read by a reading unit is changed between a first output path and a second output path. The program causes a computer to execute a process including obtaining path information indicating the use path, and based on the reading setup and the path information, displaying a suggestion indication suggesting changing the reading setup or suggesting changing the use path. With this program, the same advantages as the reading apparatus described above are achieved.

(P) An image reading system includes a reading apparatus configured such that a use path used to output a document read by a reading unit is changed between a first output path and a second output path and an external control unit included in an external device connected to the reading apparatus. The external control unit is configured to obtain path information indicating the use path and obtain a reading setup about document reading, and based on the reading setup and the path information, display a suggestion indication suggesting changing the reading setup or suggesting changing the use path.

What is claimed is:

1. A reading apparatus comprising:
   a reading unit configured to read a document;
   a transport path for transporting the document to the reading unit;
   an output path for outputting the document read by the reading unit;
   a display unit configured to display a setup screen; and
   a control unit configured to control the reading unit and the display unit, wherein
   the output path includes a first output path and a second output path that separately lead to different document output destinations, and the output path is formed such that a use path used to output the document is changed between the first output path and the second output path, and
   the control unit is configured to
      obtain path information indicating the use path and obtain a reading setup about document reading,
      based on the reading setup and the path information, cause the display unit to display a suggestion indication suggesting changing the reading setup or suggesting changing the use path,
      cause the display unit to display a registration screen for registering the reading setup,
      check correspondence between the reading setup and the path information while the reading setup is being configured on the registration screen,
      when determining that the use path is not suitable for the reading setup, cause the display unit to display the suggestion indication,
      when the reading setup is one of a plurality of reading setups registered, cause the display unit to display a list screen displaying the plurality of reading setups as a list, and
      cause the display unit to display on the list screen an alert indication for the reading setup unsuitable for the use path indicated by the path information.

2. The reading apparatus according to claim 1, wherein the control unit is configured to
   in response to receiving an instruction to start document reading, check correspondence between the reading setup and the path information, and
   when determining that the use path is not suitable for the reading setup, cause the display unit to display the suggestion indication.

3. The reading apparatus according to claim 1, wherein the control unit is configured to
   check correspondence between the reading setup and the path information while the reading setup is being configured on the setup screen, and
   when determining that the use path is not suitable for the reading setup, cause the display unit to display the suggestion indication.

4. The reading apparatus according to claim 1, wherein the control unit is configured to
   when causing the display unit to display the registration screen, cause the display unit to display on the registration screen the reading setup suitable for the path information as an initial value.

5. The reading apparatus according to claim 1, wherein the control unit is configured to
   when the reading setup is one of a plurality of reading setups registered, cause the display unit to display a list screen displaying the plurality of reading setups as a list, and
   based on the path information, reposition the plurality of reading setups displayed on the list screen.

6. A reading apparatus comprising:
   a reading unit configured to read a document;
   a transport path for transporting the document to the reading unit;
   an output path for outputting the document read by the reading unit;

a display unit configured to display a setup screen; and
a control unit configured to control the reading unit and the display unit, wherein
the output path includes a first output path and a second output path that separately lead to different document output destinations, and the output path is formed such that a use path used to output the document is changed between the first output path and the second output path,
the control unit is configured to
obtain path information indicating the use path and obtain a reading setup about document reading, and
based on the reading setup and the path information, cause the display unit to display a suggestion indication suggesting changing the reading setup or suggesting changing the use path,
in the first output path, the document is curved and outputted,
in the second output path, the document is outputted without being curved,
the reading setup includes a setting indicating whether the document is a special document,
the control unit is configured to, when the reading setup indicates that the document is the special document and that the use path is the first output path, cause the display unit to display the suggestion indication, and
the special document is a laminated document, card or booklet.

7. A reading apparatus comprising:
a reading unit configured to read a document;
a transport path for transporting the document to the reading unit;
an output path for outputting the document read by the reading unit;
a display unit configured to display a setup screen; and
a control unit configured to control the reading unit and the display unit, wherein
the output path includes a first output path and a second output path that separately lead to different document output destinations, and the output path is formed such that a use path used to output the document is changed between the first output path and the second output path,
the control unit is configured to
obtain path information indicating the use path and obtain a reading setup about document reading, and
based on the reading setup and the path information, cause the display unit to display a suggestion indication suggesting changing the reading setup or suggesting changing the use path,
in the first output path, the document is curved and outputted,
in the second output path, the document is outputted without being curved,
the reading setup includes a setting indicating whether both sides of the document are to be read, and
the control unit is configured to, when the reading setup indicates that both sides of the document are to be read and that the use path is the second output path, cause the display unit to display the suggestion indication.

8. A reading apparatus comprising:
a reading unit configured to read a document;
a transport path for transporting the document to the reading unit;
an output path for outputting the document read by the reading unit;
a display unit configured to display a setup screen; and
a control unit configured to control the reading unit and the display unit, wherein
the output path includes a first output path and a second output path that separately lead to different document output destinations, and the output path is formed such that a use path used to output the document is changed between the first output path and the second output path,
the control unit is configured to
obtain path information indicating the use path and obtain a reading setup about document reading, and
based on the reading setup and the path information, cause the display unit to display a suggestion indication suggesting changing the reading setup or suggesting changing the use path,
in the first output path, the document is curved and outputted,
in the second output path, the document is outputted without being curved,
the reading setup includes a setting as regard image data of the document,
the control unit is configured to check the setting and the path information, and when determining that the use path is not suitable for the setting, cause the display unit to display the suggestion indication, and
the setting includes
a first setting indicating whether a particular image processing operation is to be performed on image data of the document read by the reading unit and
a second setting indicating a format for outputting image data of the document read by the reading unit.

9. A reading apparatus comprising:
a reading unit configured to read a document;
a transport path for transporting the document to the reading unit;
an output path for outputting the document read by the reading unit;
a display unit configured to display a setup screen;
a casing containing the reading unit;
a supporting member supporting the casing; and
a control unit configured to control the reading unit and the display unit, wherein
the output path includes a first output path and a second output path that separately lead to different document output destinations, and the output path is formed such that a use path used to output the document is changed between the first output path and the second output path,
the control unit is configured to
obtain path information indicating the use path and obtain a reading setup about document reading, and
based on the reading setup and the path information, cause the display unit to display a suggestion indication suggesting changing the reading setup or suggesting changing the use path,
the casing is configured such that a position of the casing is changed between a first position and a second position, a tilt angle relative to a mounting surface having the supporting member differing between the first position and the second position,
when the casing is in the first position, the use path is changed to the first output path, and
when the casing is in the second position, the use path is changed to the second output path.

* * * * *